(12) United States Patent
Richter et al.

(10) Patent No.: US 11,494,711 B2
(45) Date of Patent: Nov. 8, 2022

(54) COMPUTER-GUIDED CORPORATE RELATIONSHIP MANAGEMENT

(71) Applicant: Shoobx, Inc., Boston, MA (US)

(72) Inventors: Stephan Richter, Maynard, MA (US); Jason M. Furtado, Boston, MA (US); Jennifer Lynn McPhilimy, Watertown, MA (US); Andrey Lebedev, Vilnius (LT)

(73) Assignee: Shoobx, Inc., Boston, MA (US)

( * ) Notice: Subject to any disclaimer, the term of this patent is extended or adjusted under 35 U.S.C. 154(b) by 709 days.

(21) Appl. No.: 14/946,393

(22) Filed: Nov. 19, 2015

(65) Prior Publication Data

US 2016/0140462 A1    May 19, 2016

Related U.S. Application Data

(60) Provisional application No. 62/081,648, filed on Nov. 19, 2014.

(51) Int. Cl.
*G06Q 10/06*    (2012.01)
*G06Q 50/18*    (2012.01)

(52) U.S. Cl.
CPC .......... *G06Q 10/063* (2013.01); *G06Q 50/18* (2013.01)

(58) Field of Classification Search
CPC .................................................... G06Q 50/18
See application file for complete search history.

(56) References Cited

U.S. PATENT DOCUMENTS

| 6,944,648 | B2 | 9/2005 | Cochran et al. |
| 8,239,496 | B2 | 8/2012 | Peterson et al. |
| 8,515,794 | B2 | 8/2013 | Duparc et al. |
| 8,516,540 | B2 | 8/2013 | Lerner et al. |
| 8,522,306 | B2 | 8/2013 | Lerner et al. |
| 8,589,263 | B2 | 11/2013 | Doenig et al. |

(Continued)

FOREIGN PATENT DOCUMENTS

EP    2228722 B1    9/2010

OTHER PUBLICATIONS

Workflow Engine, Wikipedia, the free encyclopedia (revision of Sep. 30, 2013, retrieved Sep. 18, 2015, 7:38 PM), https://en.wikipedia.org/w/index.php?title=Workflow_engine&oldid=575135668.

(Continued)

*Primary Examiner* — Mark D Featherstone
*Assistant Examiner* — Ranjit P Doraiswamy
(74) *Attorney, Agent, or Firm* — Michael Y. Saji

(57) ABSTRACT

A system is disclosed for organizing, managing, and reporting data relating to a corporate entity, comprising: at least one database configured to store: a first entity record representing a first legal entity; a second entity record representing a second legal entity in a relationship with the first legal entity; a source team associated with the second legal entity and further comprising team members; and a reference to a team stakeholder associated with the first entity record, the team stakeholder further comprising a reference back to the team members of the source team and access rights for the team members within the context of the first entity, thereby enabling team members associated with the second legal entity to be represented in the context of the first legal entity. The represented stakeholder may further comprise a signature, byline, title, and name.

14 Claims, 18 Drawing Sheets

(56) References Cited

U.S. PATENT DOCUMENTS

| | | | |
|---|---|---|---|
| 8,655,961 B2 | 2/2014 | McCabe et al. | |
| 8,838,980 B2 | 9/2014 | Gonser et al. | |
| 8,910,258 B2 | 12/2014 | Gonser et al. | |
| 2003/0069735 A1 | 4/2003 | Butler et al. | |
| 2004/0006594 A1* | 1/2004 | Boyer | G06F 21/6218 |
| | | | 709/204 |
| 2004/0015514 A1 | 1/2004 | Melton et al. | |
| 2007/0162308 A1 | 7/2007 | Peters | |
| 2007/0208734 A1 | 9/2007 | Koide et al. | |
| 2007/0208745 A1 | 9/2007 | Ture et al. | |
| 2008/0005667 A1 | 1/2008 | Dias et al. | |
| 2008/0040388 A1 | 2/2008 | Petri et al. | |
| 2008/0046462 A1 | 2/2008 | Kaufman et al. | |
| 2008/0077593 A1* | 3/2008 | Abrams | G06Q 10/06 |
| 2008/0209313 A1 | 8/2008 | Gonser | |
| 2009/0024912 A1 | 1/2009 | McCabe et al. | |
| 2009/0144186 A1 | 6/2009 | Debarre | |
| 2011/0106676 A1 | 5/2011 | Levi et al. | |
| 2011/0276875 A1 | 11/2011 | McCabe et al. | |
| 2012/0137367 A1 | 5/2012 | Dupont et al. | |
| 2012/0191979 A1* | 7/2012 | Feldbau | H04L 63/126 |
| | | | 713/178 |
| 2012/0284591 A1 | 11/2012 | Seed et al. | |
| 2012/0290986 A1 | 11/2012 | Zingale et al. | |
| 2013/0019156 A1 | 1/2013 | Gonser et al. | |
| 2013/0050512 A1 | 2/2013 | Gonser et al. | |
| 2013/0254111 A1 | 9/2013 | Gonser et al. | |
| 2013/0263283 A1 | 10/2013 | Peterson et al. | |
| 2014/0164542 A1 | 6/2014 | McCabe et al. | |
| 2014/0250491 A1 | 9/2014 | Fleischman et al. | |
| 2014/0304518 A1 | 10/2014 | Gonser et al. | |
| 2015/0220649 A1 | 8/2015 | Papa et al. | |

OTHER PUBLICATIONS

Christopher Null, E-Signatures: The Complete Guide to Paperless Signing, PC World (Feb. 23, 2015, 11:12 AM), http://www.pcworld.com/article/2035744/e-signatures-the-complete-guide-to-paperless-signing.html.

Craid Le Clair, Alex Cullen, Julian Keenan, The Forrester Wave: E-Signatures, Q2 2013, 1-16 (Apr. 29, 2013), http://resources.idgenterprise.com/original/AST-0093400_7f84647a-6c86-4aae-af2e-b80ef4cea578_The_Forrester_Wave_eSignature_Final_2013.04.29.pdf.

Drew Ashlock, Electronic Signature FAQ, DocuSign, (Feb. 13, 2015, 11:10AM), https://www.docusign.com/electronic-signature.

Adobe EchoSign White Paper, Adobe Systems (Feb. 23, 2015), https://www.echosign.adobe.com/content/dam/echosign/docs/pdfs/EchoSign_eSig101_Nov_2011 pdf.

* cited by examiner

FIG. 17

COMPUTER-GUIDED CORPORATE RELATIONSHIP MANAGEMENT

CROSS-REFERENCE TO RELATED APPLICATIONS

This application claims the benefit of priority under 35 U.S.C. § 119(e) of U.S. Provisional Patent Application No. 62/081,648, filed Nov. 19, 2014 and entitled "Computer-Guided Corporate Relationship Management," which is hereby incorporated by reference in its entirety for all purposes. In addition, this application incorporates the following applications by reference in their entirety for all purposes: U.S. patent application Ser. No. 14/614,227, filed Feb. 4, 2015 and entitled "Computer-guided Corporate Governance with Document Generation and Execution."

BACKGROUND

Corporate governance is a thorny and complex problem that has been difficult to solve using conventional automated systems for some time. A key insight that was reached by the inventors of the current application is that the legal state of an entity is defined by legal documents, and therefore for a computer system to accurately represent an entity's state, it must be aware of the documents in which aspects of the entity are defined. U.S. application Ser. No. 14/614,227, by the present inventors, hereby incorporated by reference in its entirety for all purposes, sets forth a system in which core records are stored in relation to documents, and in which a state of a corporate entity is able to be obtained by tracing core records forward from an original version of a document through to the most current, and legally effective, document. In some instances of the present disclosure, terms and definitions as described in the Ser. No. 14/614,227 application are meant to be imported for a full understanding of the systems and methods described herein. Such a system can keep track of information such as, who the board members of a company are at a particular time.

While a legal entity may have a natural person or persons serving in various roles, such as director, chief executive officer, board member, or just even being an employee legal entities may also have relationships with other non-human persons. For example, a company may be co-owned by another company, e.g., the other company owns some number of shares of the company. As another example, a company may enter into a contract with another company. As another example, a company may have a legal advisor relationship with a law firm, or an investment relationship with an investment firm. Since these relationships do not involve natural persons, in some cases it may be necessary to distinguish between a legal person and the natural person who is representing the legal person in a relationship. For example, a corporation may grant its board members shares in the company, and the board members may be required to both authorize the grant in their capacity as board members and receive the grant in their individual capacity. In other cases, it may be necessary to distinguish between the two persons for the reason that a corporate relationship survives the individual persons in a role. For example, a law firm partner may retire, but the fiduciary duties owed a company by that law firm do not expire when an individual partner retires.

A solution is desired that interoperates with, clarifies, and augments the computer system described in U.S. application Ser. No. 14/614,227 to track and memorialize information relating to relationships between non-natural persons.

SUMMARY

Systems and methods are disclosed for organizing, managing, and reporting data for related legal entities and for persons representing legal entities. The systems described herein allow a computer system to represent the complex legal relationships that exist between companies, such as investor/investment relationships or law firm/client relationships, and to use these representations to verify and authorize the activity of users in the system. Used in conjunction with a system for representing legal information about corporate entities, the combined system can allow and facilitate users of the system to change legal information or status of an entity, or to perform legally-binding actions through signing of documents.

In one embodiment, a system is disclosed for organizing, managing, and reporting data relating to a corporate entity, comprising: at least one database configured to store: a first entity record representing a first legal entity; a second entity record representing a second legal entity in a relationship with the first legal entity; a source team associated with the second legal entity and further comprising team members; and a reference to a team stakeholder associated with the first entity record, the team stakeholder further comprising a reference back to the team members of the source team and access rights for the team members within the context of the first entity, thereby enabling team members associated with the second legal entity to be represented in the context of the first legal entity. The represented stakeholder may further comprise a signature, byline, title, and name.

In another embodiment, a system is disclosed for representing relationships between corporate entities, comprising: a first entity record, further comprising a relationship team of members; and a second entity record, further comprising a relationship object referring to the relationship team of members from the first entity record, the relationship object further comprising access privileges to stored procedures to be performed on behalf of the second entity record.

The relationship object may refer uni-directionally to the relationship team from the first entity record. The first entity record may be stored within the second entity record and its relationship team of members contain multiple roles for a single user, thereby enabling the single user to sign documents in a representative capacity.

In another embodiment, a system is disclosed for performing business actions in a database system, comprising: at least one database configured to store an entity record, a document record, and a stakeholder record, the entity record for a first entity enabled to relate itself to a second entity record for a second entity by referring to a relationship team, and by setting access privileges for members of the relationship team so that the members of the relationship team of the second entity may perform actions on behalf of the first entity, and a business logic module configured to provide creation of document records with document signing, and configured to create documents with a byline for electronic signature by the members, thereby enabling document signing on behalf of a corporate entity or a represented corporate entity.

In another embodiment, a system is disclosed for performing business actions in a database system, comprising: at least one database configured to store an entity record, a document record, and a stakeholder record, the entity record for a first entity enabled to relate itself to a second entity record for a second entity by referring to a relationship team, and by setting access privileges for members of the relationship team so that the members of the relationship team of the second entity may perform actions on behalf of the first entity, the access privileges stored as a hierarchical tree of roles and associated with individual members of the relationship team; and a security module for granting access to users, the security module configured to perform a set-based intersection of roles assigned to the user and roles delegated to the second entity record by the first entity.

In another embodiment, a system is disclosed for organizing, managing, and reporting data relating to a corporate entity, comprising: at least one database configured to store an entity record, a document record, and a stakeholder record, the entity record representing a legal entity, the document record relating to a corporate action of the legal entity and further comprising a core record, the core record further comprising a provenance of the value reflecting a chain of documents that together reflect a canonical state of the corporate entity and a history of states of the corporate entity for allowing the business logic module to assess validity of the value at a given time by evaluating where the value was originated, the stakeholder record comprising one of a represented stakeholder record for representing a single system user and a team stakeholder record for representing multiple system users, the team stakeholder record further identifying access rights for each system user represented in the team; and a business logic module, coupled to the at least one database and configured to create the stakeholder with the role and to bind the stakeholder to the entity record, the business logic module thereby enabling the system to determine whether a given stakeholder has a particular role represented in the entity record for the legal entity.

In another embodiment, a system is disclosed for organizing, managing, and reporting data relating to corporate entities in relationship with each other, comprising: at least one database configured to store a relationship source entity record and a relationship target entity record, each of the entity records representing legal entities, the relationship source entity configured to reference a team stakeholder record, the team stakeholder record further comprising a list of team members and access rights for each team member in the list of team members with the access rights organized in a hierarchical structure and labeled with a name, the relationship target entity configured to have a list of access rights; and a business logic module, coupled to the at least one database and configured to match the access rights of a team member of the relationship source entity to the list of access rights of the relationship target entity using a text-based matching system, the business logic module thereby enabling the system to determine whether a given legal entity has a relationship with another legal entity. The text-based matching system may enable all access rights further down in the hierarchy to be matched when a parent access right in the hierarchy is matched.

BRIEF DESCRIPTION OF DRAWINGS

FIG. 17 is a schematic diagram of a user interface for adding a team member, in accordance with some embodiments.

DETAILED DESCRIPTION

Figure 1:
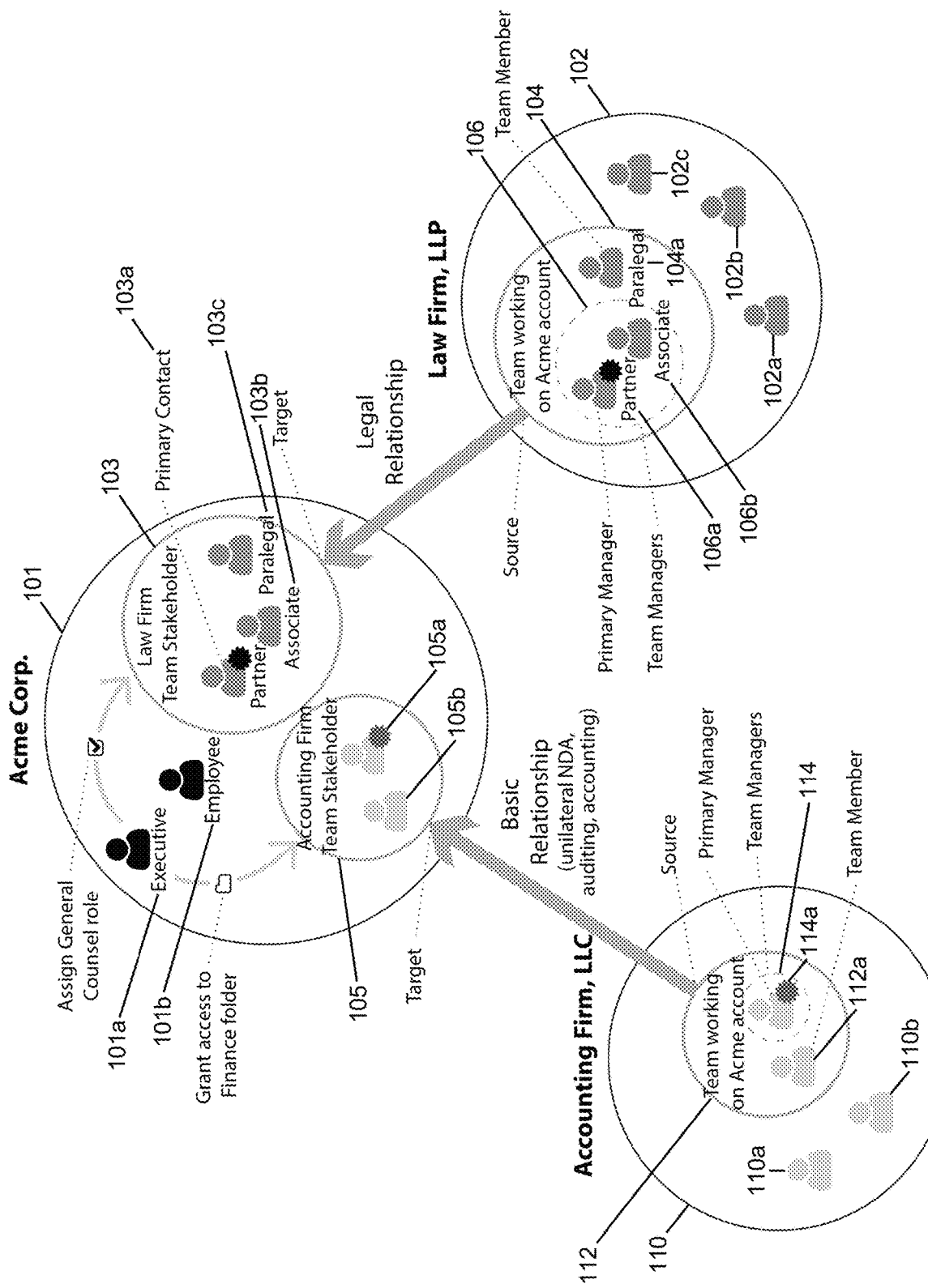
FIG. 1 is a schematic diagram of a relationship between legal entities, in accordance with some embodiments.

FIG. 1 is a schematic diagram of a relationship between legal entities, in accordance with some embodiments. Corporation 101, "Acme Corp," is a corporation represented in the system as an entity. Corporation 101 may have an executive, such as the chief executive officer, represented in the system, 101a, as well as an employee 101b. Corporation 101 may have a relationship with a law firm 102, "Law Firm, LLP," as well as with another company 110. The relationship with the law firm may be a legal relationship. The relationship with the other company 110 may be a variety of other corporate relationships, but could be, for example, a relationship with a financial auditing firm, a relationship with an accountant, or a relationship with a party with whom corporation 101 wants to share information under a non-disclosure agreement.

One aspect of the corporate relationships in the current disclosure is that when two companies enter into a relationship, a source entity provides a group of people, called a relationship team, to a target company. This is shown in FIG. 1. Law firm 102 provides relationship team 104 to Acme Corp 101. Within Acme Corp, the relationship team 104 is represented as team stakeholder 103. Team stakeholder 103 belongs to Acme Corp and its members can receive delegated access rights, roles, and other privileges that may be delegated to it by Acme Corp, through executive 101a.

Acme Corp 101 contains law firm team stakeholder 103, including Law firm's 102 Acme relationship team members 104a, 106a, 106b as represented stakeholders 103c, 103a, 103b, respectively. The primary manager 106a is designated as the primary contact 103a. Acme Corp 101 also has team stakeholder 105, including represented stakeholders 105a, 105b, whereby 105a is the primary contact for that team stakeholder 105.

Law firm 102 contains relationship team 104, which further contains a subset 106 of the relationship team that are managers of the relationship. Partner 106a and associate 106b may be managers. Paralegal 104a may be a member of the relationship team. Other personnel 102a, 102b, 102c, 102d, 102e may not be part of the relationship team, and may not have access to any information or rights pertaining to Acme Corp 101.

Certain employees of law firm 102 may be partners, 106a, 102b, 102d. Other employees may be associates 106b, 102a, 102e, or paralegals 104a, 102c. Partner 106a may be designated the primary manager, and may have all management and access rights delegated to law firm 102. Not all the partners of law firm 102 may have any access to Acme Corp 101.

Company 110 includes relationship team 112, further including managers 114. Person 114a may be the primary manager. Person 112a may be a member of relationship team 112, and persons 110a, 110b, 110c may be contained within company 110 but not be part of relationship team 112, giving them no access to Acme Corp.

Acme Corp 101's executive 101a has authority by virtue of his or her title in the organization. This title may be stored elsewhere in the system as a core record, as described elsewhere herein and/or in U.S. patent application Ser. No. 14/614,227. Executive 101a may delegate access to, for example, the H.R. documents of Acme Corp. to team stakeholder 105, and thereby to persons 105a and 105b, who are employed by company 110 and are on its relationship team 112. Person 105a and person 114a may be references to or instances of a single user on the system. Person 105b and person 112a may be references to, or instances of, another single user on the system. Although two references exist to the same person on the system, one instance is logically contained within Acme Corp 101, and another instance within company 110, and each instance may have different roles and access rights.

In this disclosure, and in some embodiments, the instance located within company 110 is called the source, and the instance located within company 101 is called the target. The relationship between Acme Corp 101 and company 110 is therefore unidirectional, with company 110 as the source providing a team of people to Acme Corp 101 as the target. Within the target entity, a single person may be designated a primary contact. Within the source, the same person may be designated the primary manager. At the source, the primary manager may delegate access rights pertaining to Acme Corp 101 to one or more persons within the relationship team 112 at the source. At the target, the primary contact 105a receives all communication, for example email, that is sent to team stakeholder 105.

Team stakeholders 103 and 105 play a role in enabling personnel of company 102 and company 110, respectively, to have access rights within company 101. In some embodiments, the rights within company 101 are tied to a stakeholder record. However, a special stakeholder record type, called a team stakeholder, is used in the system to permit rights to be shared to other entities.

As described in patent application Ser. No. 14/614,227, any stakeholder record can be assigned roles. It is transparent to the system and the stakeholders within an entity, such as Acme Corp 101, whether those roles are granted to a stakeholder representing a person or a team stakeholder representing another entity. For example, FIG. 1 shows that Acme Corp. uses an outside law firm 102 to be its general counsel. In another embodiment, Acme Corp 101 could also assign the General Counsel role to a person stakeholder.

In some embodiments, a legal relationship, such as the relationship shown here with respect to law firm 102, may be considered special by the system. For example, review of documents and contracts by lawyers may be a suggested or required step in many different workflows in the system, and as such, lawyers may be accorded special status, in some embodiments. As another example, a small company may outsource its general counsel role to a law firm. As a general counsel has the legal authority to perform all, or almost all, actions on behalf of a company, this results in the law firm having a high level of access to the company. In some embodiments, this behavior may be encoded in key data structures, in workflows or other business logic, or in user interface logic, or in more than one of these.

Figure 2:
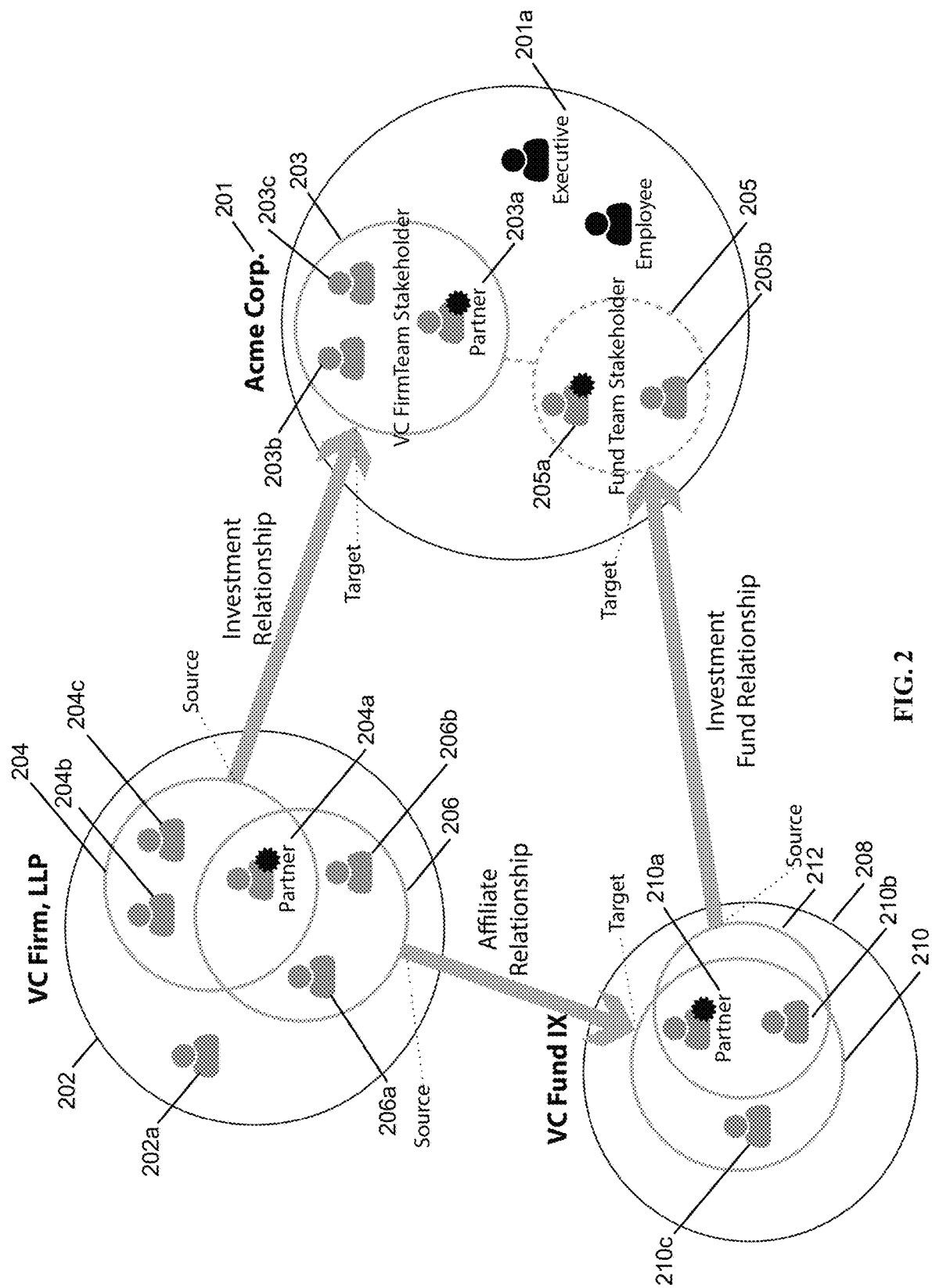
FIG. 2 is a schematic diagram of a relationship between an investment firm, one of its affiliate funds, and a company, in accordance with some embodiments.

FIG. 2 is a schematic diagram of a relationship between an investment firm, one of its affiliate funds, and a company, in accordance with some embodiments. Acme Corp. entity 201 includes executive 201a, VC firm team stakeholder 203, and VC fund team stakeholder 205. VC firm entity 202 includes relationship team 204 and relationship team 206. VC firm entity also includes VC partner 202a, who is not involved with Acme Corp; VC partner 204a, who is involved with Acme Corp and is the primary contact; associates 204b and 204c, who are involved with Acme Corp; and associates 206a and 206b, who are involved with VC fund entity 208. VC fund entity 208 includes relationship team 210, which includes primary contact/partner 210a and associates 210b and 210c, and relationship team 212, which includes primary contact/partner 210a and associate 210b. VC firm team stakeholder 203 includes primary contact 203a and team members 203b and 203c all of which are enabled to have access rights to Acme Corp 201 within the context of VC team stakeholder 203. VC fund team stakeholder 205 includes primary contact 205a and person 205b who are enabled to have access rights.

The relationship between Acme Corp. 201 and VC firm 202 can be described as an investment relationship. However, private equity and venture capital firms generally invest their money in companies indirectly, through affiliate entities that are set up individually for each fund. In order to model this type of relationship properly in the disclosed system, an investment fund is enabled to be modeled as its own entity, here VC fund IX 208, which has an affiliate relationship with VC firm 202. Also, as it is preferable for a user of the system, either an executive of Acme Corp 201 or a partner in VC firm 202, to see the investment as being an investment by the VC firm and not by the fund, the two entities 203 and 205 may be coalesced by the business logic or user interface logic of the system so that a user sees the VC firm as the only entity and does not see the VC fund entity, in some embodiments, except when it is desired to see the VC fund entity itself. Coalescing certain relationships in this way enables the system to model these relationships without the use of chaining relationships, such that only one level of relationship is required to be implemented in the system.

Figure 3:
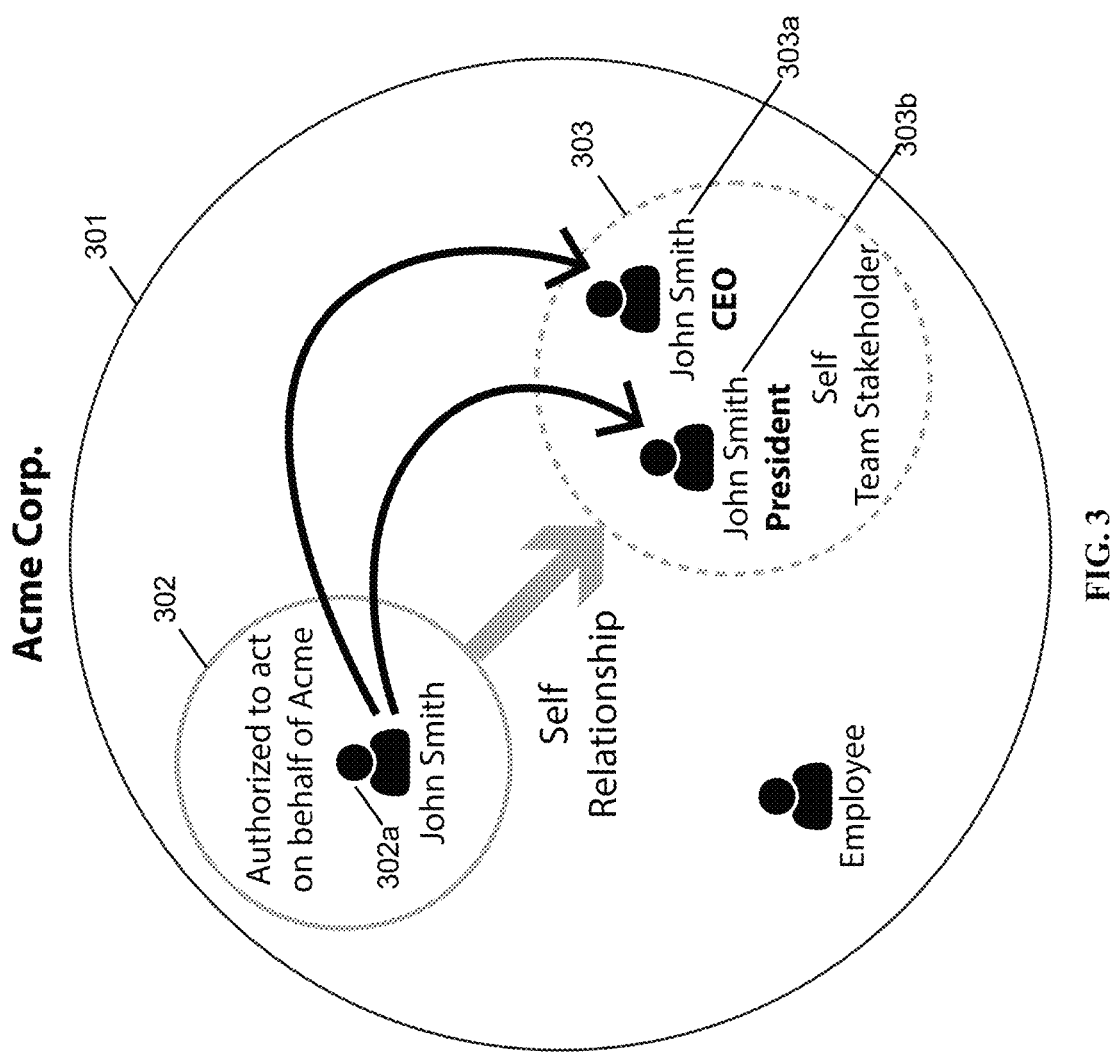
FIG. 3 is a schematic diagram of a self-relationship in an entity, in accordance with some embodiments.

FIG. 3 is a schematic diagram of a self-relationship in an entity, in accordance with some embodiments. While the above paragraphs describe how a person is able to act on behalf of a third party company or other entity, in the more common case, a person may need to act on behalf of the company he or she is a member of, which is enabled, in some embodiments, as shown in FIG. 3. Entity Acme Corp. 301 contains or includes a user 302*a*, "John Smith," who corresponds with a single user. John Smith and another employee 301*a* are part of entity 301. John Smith 302*a* is further contained within a team 302, stored via an ordinary entity record, that contains stakeholders who can act on behalf of Acme Corp. 301.

Team stakeholder 303 is also contained within the entity record 301 for Acme Corp. Users are able to sign documents and perform actions on behalf of Acme Corp. if they are members of a team stakeholder assigned to certain Acme Corp. actions. Team 302 is the source in a unidirectional relationship with target 303, whereby both, the source and target entities, are Acme Corp for this special self-relationship. Team 302 shares team member 302*a*, "John Smith," with Acme Corp via the self relationship. John Smith 302*a* may be shared either as a person with a CEO role 302*a* or a person with president role 302*b*. In this way, Mr. Smith may execute actions under multiple roles within Acme Corp.

Figure 4:
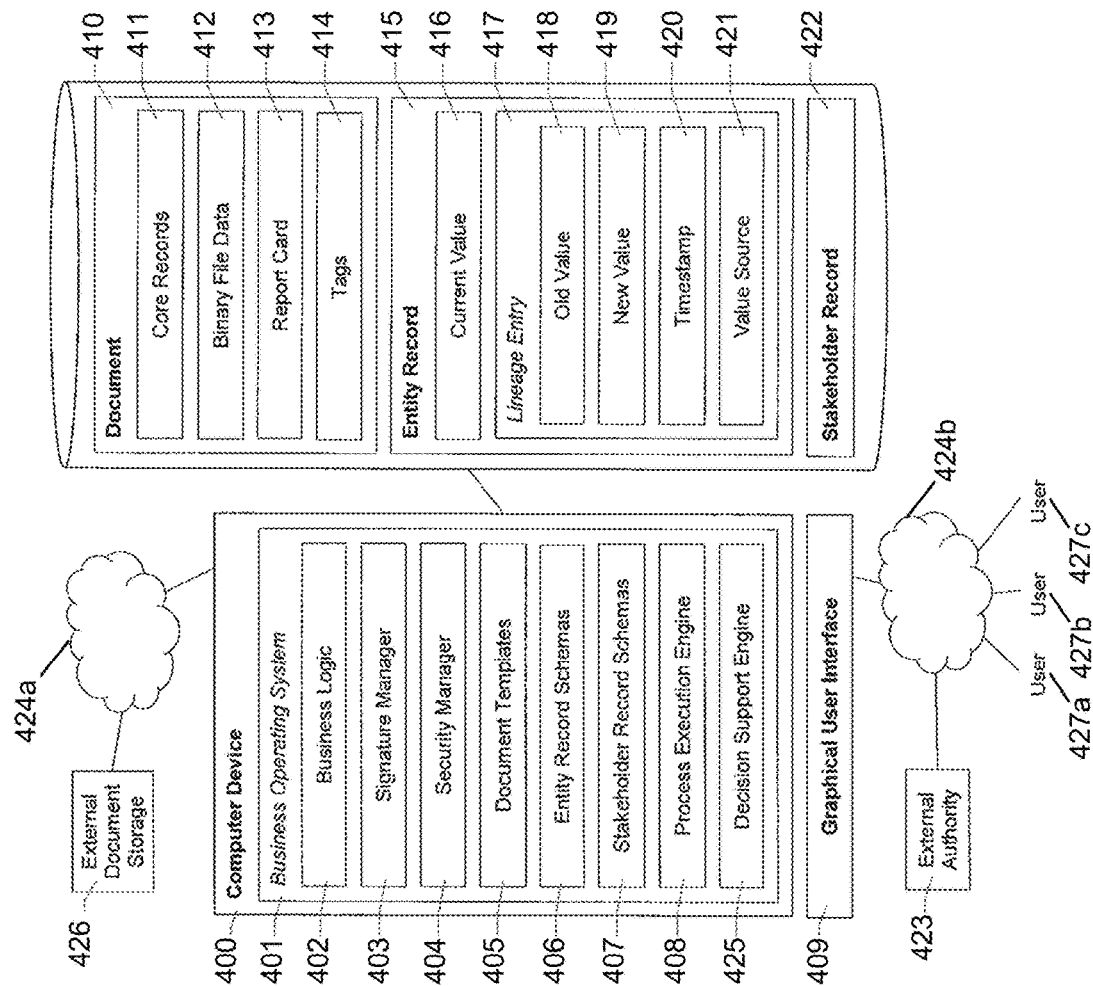
FIG. 4 is a schematic diagram of a system in accordance with some embodiments.

FIG. 4 is a schematic diagram of a system in accordance with some embodiments. Computer Device 400 may be an application server, or a group of application servers, such as the app tier 503 shown in FIG. 5. Computer Device 400 may be an application server, or a group of application servers. Computer Device 400 includes a business operating system 401, which further includes business logic 402, signature manager 403, security manager 404, document templates 405, entity record schemas 406, stakeholder record schemas 407, process execution engine 408, and decision support engine 425. Business logic 402 may be one or more business processes, configured to be executed by process execution engine 408. Examples of a business process are: incorporation; nomination of a board; creating board resolutions; creating a stock plan; granting stock to an employee; and identifying a consultant or an employee, among other examples. Signature manager 403 may provide functionality and services for storing electronic signatures, retrieving prior-stored signatures, and reading and writing quick response (QR) codes. Security manager 404 may provide functionality pertaining to the security of the system, such as logging, transaction monitoring, authentication and authorization, auditing and reporting, as well as interfacing with third-party security functionality and services.

Document templates 405, entity record schemas 406, and stakeholder record schemas 407 provide the framework for data to be stored on the system. Document templates 405 provide templates for a variety of types of documents. As the documents are intended to be legal documents for a company's business processes, some or all of the document templates may be authored by attorneys according to state and federal law, with particular attention to Delaware corporate law. The document templates may be predefined and inalterable, or they may be alterable such that a company may make changes to the document templates by uploading new templates, or the document templates may be individually alterable. The entity record schemas 406 may include schemas for various types of corporate entities, such as S-corporations, C-corporations, limited liability corporations and partnerships, and may include parameters such as state of incorporation, address of incorporator, address of corporation, primary address, board membership, corporate structure, and other parameters. The stakeholder record schemas 407 may define a stakeholder as a person within the context of the entity, with contact information for the person such as address, email address, and phone number(s), and may also define a stakeholder as having one or more roles, such as board member, board secretary, shareholder, corporate officer, or other roles. A single stakeholder may hold more than one role; a user may also hold one or more roles for one or more corporate entities.

Decision support engine 425 may provide analytics for real-time reporting during the execution of a business process, based on data available to the business operating system. For example, if multiple people known to the business operating system have the title "Chief Engineer," the system may be able to compute basic analytics on this set of people to provide information regarding their average and median salary, stock compensation, etc., in real time such that at the time a new hire contract is being created on the system, the relevant information is provided to the user. Decision support engine 425 may rely on external document storage 426 for this information, and may also rely on business logic 402 and process execution engine 408 to determine when the decision support engine 425 may be invoked.

Application server 400 may interact with external document storage 426 via network 424*a*. In some embodiments, external document storage 426 may be for storing generated documents in binary format only, such that a user may be able to retrieve relevant legal documents at any time without use of the business operating system 401. The external document storage provider may be, for example, Box.com, Dropbox, Google Drive, a private WebDAV file store, or any other cloud-based content storage solution. In other embodiments, external document storage may be used for storing all information, including information formatted according to document templates 405, entity record schemas 406, and stakeholder record schemas 407. Application server 400 may also interact with external authority 423 and users 427*a*, 427*b*, 427*c* via network 424*b*. An external authority 423 may be provided for authenticating users on the system. For example, an external authority may provide two-factor authentication support such that a user may be authorized by the external authority before being granted access to business operating system 401. Graphical user interface 409 may provide a visual interface to business operating system 401; the user interface 409 may appear in a web browser and may combine results and outputs from multiple parts of business operating system 401 into a single outputted HTML page. In some embodiments, the HTML page may contain functionality as well, such as input validation functionality performed in JavaScript, in order to provide higher-quality data to the underlying system.

Document 410 includes core records 411, binary file data 412, report card 413, and tags 414. Entity record 415 includes current value 416 and lineage entry 417, which includes old value 418, new value 419, timestamp 420, and value source 421. Stakeholder record 422 is also shown. Each of the above data objects is stored in a database at a database server, and may be stored in a relational database, such as PostgreSQL, in a non-relational manner, such as in the JSONB format. In some embodiments, data elements may comprise references to other data objects. For example, the binary file data 412 in document 410 may be actual binary file data stored in a database, or may be a reference to binary file data stored outside of a database, for example, as a uniform resource indicator (URI) indicating the location of a file accessible via HTTP from another server. Also, the value source 421 that is part of lineage entry 417 may be a reference to another object, such as another document object, and may not be the object itself. In some embodiments, an array of lineage entries may be stored in entity record 415.

Document 410 is intended to permit multiple core records 411 to be associated with the document. For example, a certificate of incorporation would have at least a core record for the company's address and another core record for the founders of the company. In some embodiments, the report card may or may not be present; when present, the report card may be updated at the time the document object is saved or at a later time based on when processing resources are available for calculating the trustworthiness of the data associated with the document. In some embodiments, a single binary file data object 412 is associated with one document object 410. Documents may be associated with entity records as well, in some embodiments.

In some embodiments, tags 414 are free-form text and may be human-readable. Multiple tags may be associated with a single document. In some embodiments, the tags may have a hierarchical structure to facilitate search and retrieval. Certain tags may be special; for example, the "active" tag indicates to the system that a document is legally in effect, and may be automatically updated when a new document is created or when an older document is superseded; also, entity records may be associated with documents as tags, in some embodiments. Superseding of a document may be quickly determined by the system performing a search for the type of document, e.g., "stock option plan," to find all documents with a particular type for a particular entity record.

In some embodiments, an entity record 415 may include both a current value 416 and a lineage entry 417. Although an entity record contains a current value 416, the entity record's current value 416 duplicates the value stored in the lineage entry. This facilitates retrieval of the value without dereferencing any references in the lineage entry, and may be thought of as a cached value. Lineage entry 417 includes at least a value source 421, to indicate that the lineage of the current value is originally from that other object. Lineage entry 417 may also include old value 418, which is the value that was previously stored in the entity record; new value 419, which is the same as the current value 416 and the value of that entity in value source 421; and a timestamp 420. Current value 416 may be thought of as a cached value. Current value 416 points to an up-to-date value of the core record, even if the core record has been modified.

Value source 421 may be a reference to another object, such as a document. For example, if a stock option plan was put into place at a prior date, the number of authorized shares of a corporation would be determined by the active stock option plan document, so although the entity record for the corporation would include the number of shares of the corporation, it would also indicate that the number of shares originated in the active stock option plan document. An auditor would thus be able to determine the source of the number of shares upon later review.

In some embodiments, a value source 421 may be a stakeholder record and not a document. This may occur when a value is manually entered without reference to a prior document, or when a document is uploaded and does not contain generated values in the system.

In some embodiments, stakeholder record 422 may include one or more roles (not shown), as well as basic information about the stakeholder, such as name, address, phone number, email, and so on (not shown). A role indicates what actions that may be performed or initiated by the stakeholder.

Figure 5:
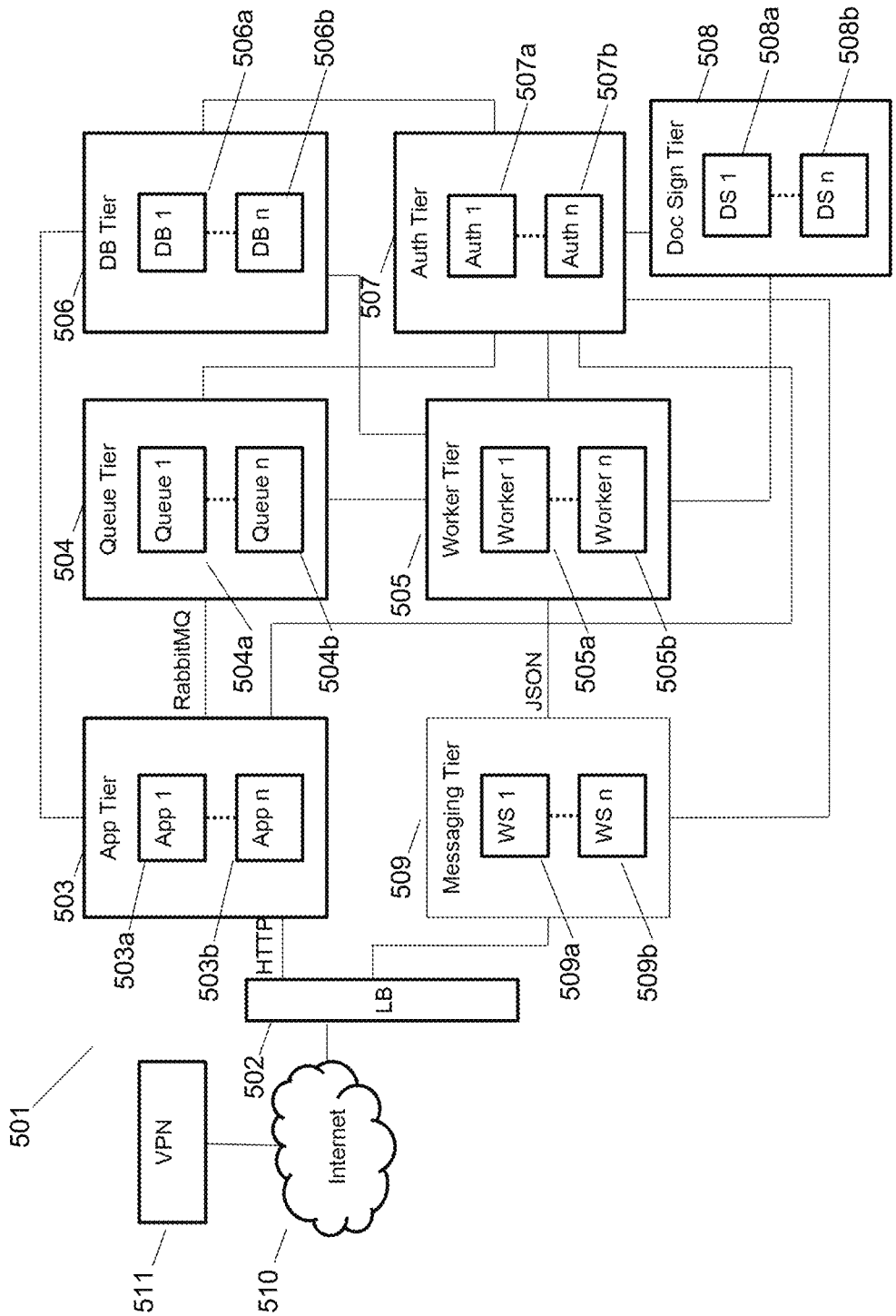
FIG. 5 is an architecture diagram of a system in accordance with some embodiments.

FIG. 5 shows a network diagram of a platform for providing the services described herein, in accordance with some embodiments. Business operating system platform 501 may include load balancer 502, app tier 503, queue tier 504, worker tier 505, database tier 506, authentication tier 507, document signing tier 508 and messaging tier 509. Each tier may include one or more servers that may be virtual servers or physical servers. The servers may be activated or deactivated as needed based on load parameters that may be determined by the business operating system, wherein the load parameters include CPU load and network bandwidth utilization.

Load balancer 502 acts as a gateway between the remainder of platform 501 and the public Internet, in some embodiments. Load balancer 502 also may allocate incoming requests among servers in app tier 503. In some embodiments, an HTTP load balancer such as nginx may be used.

App tier 503 includes one or more web servers 503a, 503b for receiving web requests via Hypertext Transfer Protocol (HTTP), in some embodiments. The web servers may then determine what tasks, if any, need to be distributed to either a database tier 506 or a queue tier 504. The web servers may then return fully- or partially-rendered web pages to a requesting web browser. As the web browsers are behind load balancer 502, different servers may service different web requests. In some embodiments, the web servers may be web application servers, and the applications running on them may be precompiled, linked at runtime, Common Gateway Interface (CGI) applications, modules executed by a web server process, or otherwise executed. The web servers may also integrate their own load balancing, in some embodiments. In some embodiments, load balancing may occur only at 502, only at 503, or at neither, or both points in the system.

The queue tier 504 and the worker tier 505 may include one or more servers, and may include a facility to activate or deactivate servers as needed to meet the needs of the service, in some embodiments. The queue tier 504 may receive requests from the app tier 503 and may identify sub-tasks, which may then be sent to worker tier 505 to be executed. The queue tier 504 may use a queuing messaging protocol such as RabbitMQ for assigning tasks to processes at the worker tier, in some embodiments. The queue tier 504 may use the Celery queuing software with well-known queuing algorithms to provide reliable service.

The worker tier may execute sub-tasks, such as rendering documents, executing processes, requesting data from database tier 506, and sending emails, in some embodiments. The sub-tasks may execute at the worker tier as threads, processes, or via another processing abstraction that is capable of being processed in parallel. The sub-tasks may involve one or more requests for data from other servers or network nodes. Rendering documents may cause portions of documents to be rendered to text, Hypertext Markup Language (HTML), partial HTML (HTML snippets), JavaScript, JSON, Portable Document Format (PDF), the ReportLab report markup language (RML), or another format. Rendering documents may also involve combining data stored in core records with data stored in or generated by document templates, as described above. In some embodiments, reports, including reports generated by ReportLab from RML, and including audit reports and logs, may be generated. In some embodiments, documents may be generated based on user input and then sent back to the app tier 503 for authentication by the authentication tier 507.

Execution of processes may involve the use of processes stored as eXtensible Markup Language (XML), XML process definition language (XPDL) workflows, or other data that define the process, and may involve the creation of or modification of entity records, core records, stakeholder records, or other records. Emails may be sent by the worker tier to, for example, send reminders about approaching deadlines or to send password reset messages. When worker tier 505 completes work and/or receives an appropriate response from one or more other servers, it sends a message, which may be HTTP JSON, to a messaging tier 509, which is responsible for assembling a reply and sending it back to a requesting user via load balancer 502.

Database tier 506 may receive requests for data from worker tier 505, and may retrieve information stored in the form of one or more core records, entity records, or stakeholder records. Data may be written to one or more databases as serialized JSON objects. The database tier 506 may use a database that enables JSON storage, such as PostgreSQL 9.4 or above using the JSONB data type. Data from multiple entities may be distributed across database servers in various ways. In some embodiments, all data for a particular corporate entity may be placed on a single database server, enabling sharding of large databases on a per-entity basis and providing added security for each entity. Data may be requested from the database tier by a worker tier or by the app tier directly. When data is needed to perform a task or sub-task, in some embodiments, the worker tier may cause data to be retrieved from the database tier. In other embodiments, the queue tier may create data retrieval requests from the database tier, or both the queue tier and the worker tier may send requests to the database tier. When data is created by the worker tier, for example, an HTML snippet, a complete PDF file, or a new or modified entity record in a corporate entity, data may be sent to and stored in the database tier 506 as JSON. In some embodiments, a cache or alternative data structure server such as memcached or Redis may be used for improving the read/write performance of database tier 506.

Also shown are authentication tier 507 and document signing tier 508. Authentication tier 507 serves to identify whether the logged-in user has the proper credentials to perform a particular process or sign a particular document. Authentication tier 507 may use the lightweight directory access protocol (LDAP) within an organization, or using an LDAP server (not shown), to authenticate a user. Authentication tier 507 may use the Red Hat FreeIPA suite, which includes LDAP, for managing identity, policy, and audit functions, including for keeping an audit log. Authentication tier 507 may also use Kerberos to permit users and other nodes securely prove their identity, or to securely prove the identify of the platform to external providers. Authentication tier 507 may permit the use of two-factor authentication. Document signing tier 508 may be responsible for communicating with a third-party system, such as GlobalSign, to cause the third-party system to use a root-authenticated certificate to cryptographically sign the document after it is finalized, using Adobe Certified Document Services (CDS), to prevent modification of the document. The cryptographically-signed document may be saved to database tier 506 as a PDF associated with a document object.

Document signing tier 508 may use a Java library to communicate with a secure signing service located at an external network provider. Document signing tier 508 may include modules for interpreting both Java and JSON, for communicating with services internal to system 501.

One or more of the above application servers, web servers, load balancing servers, database servers, or other servers may be running a Linux operating system. In some embodiments, when used in a production role, the servers may be configured to have a minimum of services active, excepting only the specific services described above. This has the advantage of increased security, which is desirable when performing corporate processes and providing secure authentication services. In other embodiments, the servers may have additional active services. In some embodiments, a virtual private network (VPN) server 511 may provide the sole connection to the outside Internet for the system, thereby acting as a security gateway. In other embodiments, users may connect directly via network 510 to the system. Whether or not a VPN is used as a security gateway, access to applications may be limited through the load balancer as a gateway.

In some embodiments, one or more of the servers described may operate using the Linux operating system, and/or using an Ubuntu distribution of Linux. Various messaging protocols may be used between tiers, including for message passing; for example, RabbitMQ and Celery queuing and message passing middleware may be used. HTTP and JSON may be used as protocols for transmitting data. The web servers may use web applications written in Python in conjunction with a web server, such as the Nginx web server. Caching may be performed at one of the app tier, queue tier, or database tier using a web cache or object cache such as Redis. Servers as described herein may be virtual servers. Access to the platform may be partially limited to or solely through a virtual private network (VPN).

Figure 6:
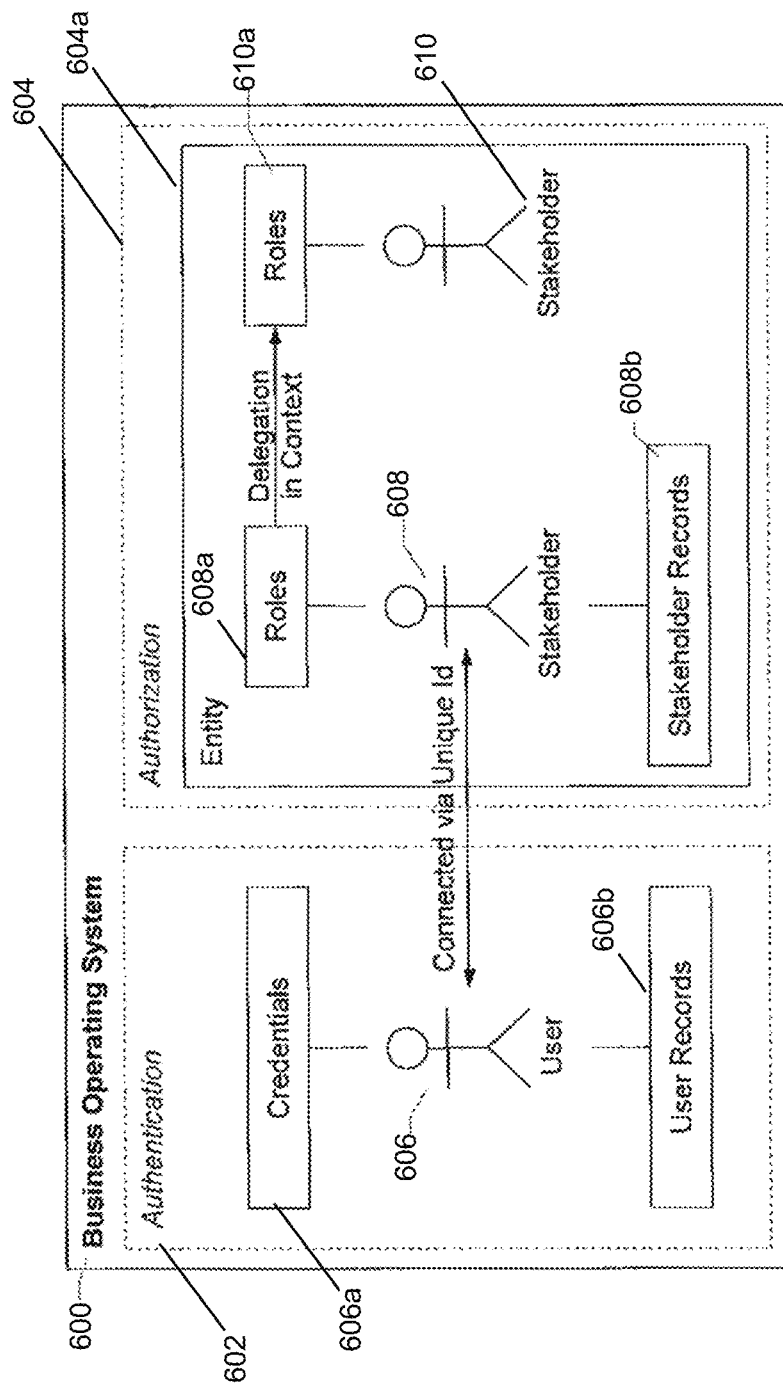
FIG. 6 is a schematic diagram of authentication in a system in accordance with some embodiments.

FIG. 6 is a schematic diagram of users and stakeholders and their security roles, in accordance with some embodiments. Business operating system 600 includes an authentication module 602 and an authorization module 604. Authentication module 602 is for identification of the user, e.g., is the user who he or she claims to be? Authentication module 602 includes credentials 606a and user records 606b for user 606. Authorization module 604 is for determining whether the specific user should be permitted to take a specific action, e.g., has the user been assigned the capability to perform this action? All records for the authorization module relate to at least one specific entity 604a; additional entities are not shown but may be present. Stakeholder roles 608a and stakeholder records 608b are associated with stakeholder 608. Additionally, stakeholder 608 may have received delegated roles 610a from stakeholder 610. Authorization module 604 also may determine what information the user has access to in the system. Authorization module 604 may use roles to determine what information, actions, or capabilities the user has access to.

In operation, user 606 may present his or her credentials to the system, which are matched against credentials 606a to verify the user's identity at authentication module 602. In some embodiments, two-factor or multi-factor authentication may be used. Once the user has authenticated, the user records 606b are retrieved by the system and all entities for which the user is a stakeholder are retrieved by the system as well, using the unique IDs for each user-stakeholder pair. Next, each user-stakeholder pair is evaluated for its roles 608a, 610a to determine whether a certain task is permissible. As each role includes permissions for many different actions and access to various information, role may be thought of as a keychain, containing many keys. In some embodiments, a context of the user on the system is taken into account in addition to roles (e.g., additional capabilities may be granted to a human resources user when the actions are performed on or from a human resources landing page, sub-site, or section of the user interface).

Figure 7:
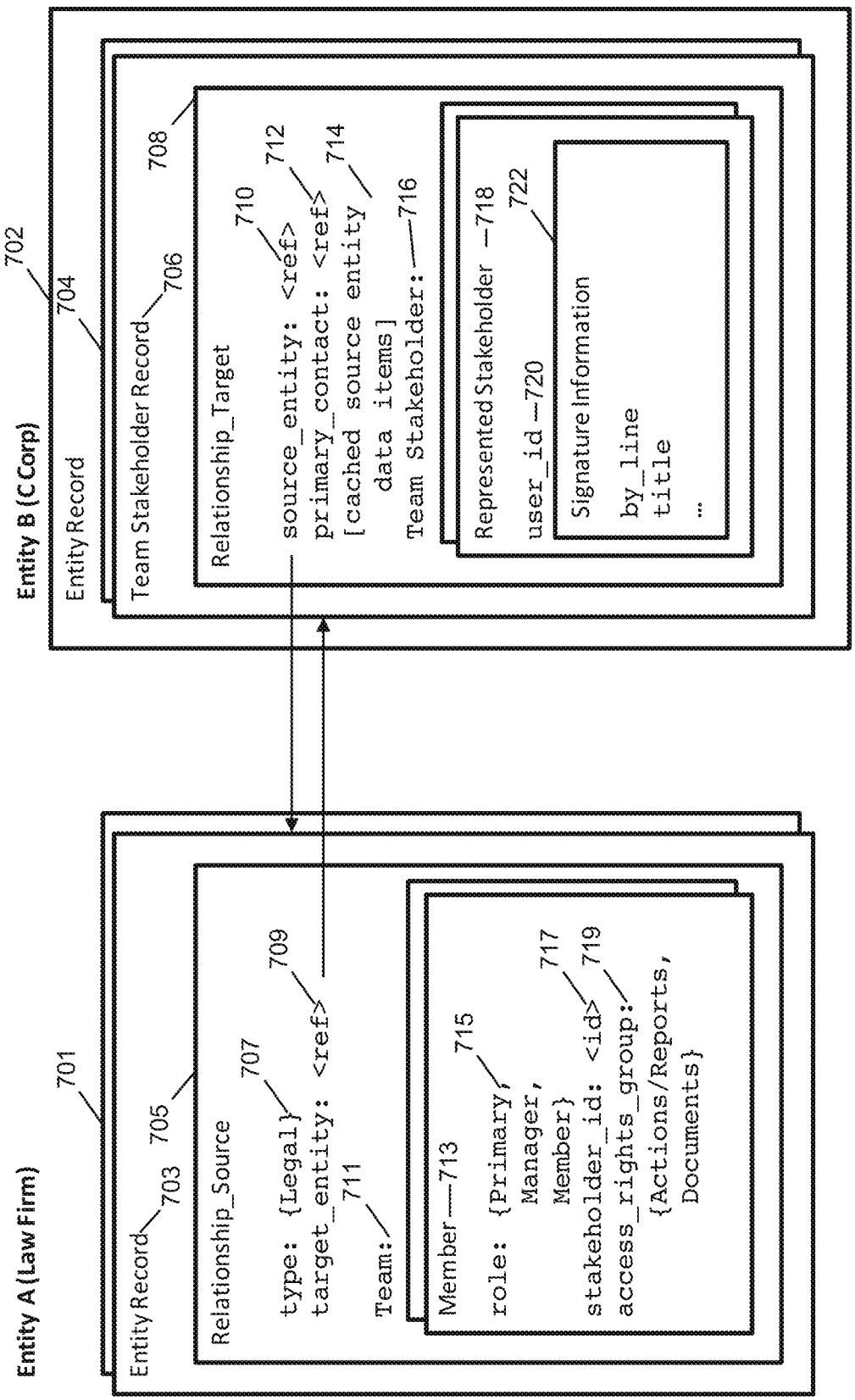
FIG. 7 is a data model diagram of entity relationships in accordance with some embodiments.

FIG. 7 is a data model diagram of entity relationships in accordance with some embodiments. Entity A 701 is an internal representation of a law firm. Entity B 702 is an internal representation of a C-corporation. Each entity includes records: entity 701 includes entity records 703, and entity 702 includes entity records 704. Entity records 704 includes team stakeholder records 706. Team stakeholder records 706 includes target relationship record 708, and entity record 703 includes source relationship record 705. As described above, source relationship record 705 includes a list of team members that are provided by entity A 701 to entity B 702.

Source relationship record 705 includes, in some embodiments, data field type 707; reference to target entity record 709, which refers to entity record 704; and list of teams 711. Each list of teams 711 includes a list of members 713. Members 713 include roles 715, which include one of primary contact, manager, and member; stakeholder ID 717, uniquely identifying each stakeholder as a stakeholder (in a separate namespace from user IDs, in some embodiments); and a list of groups granting access rights 719.

Target relationship record 708 includes source entity reference 710, which refers to entity record 703; primary contact reference 712, which is a specific member; a list of cached source entity data items, for speed, 714; and a team stakeholder 716, whose members are represented stakeholders 718, each of which includes a user ID 720, uniquely identifying a system user in a user namespace, and signature information 722, which includes a byline and a title. The signature information is exactly what is placed on a document if a user signs the document using this identity. The signature byline reflects the name of a user, and the signature title reflects the present role being used for signing, which allows a human reader to verify that the person signing has the legal authority to do so. In this way, the signature information is human-readable and designed to provide both human and computer system verifiability.

In operation, FIG. 7 reflects the data structures used to track relationships between companies. Entity relationships between parties are reflected by the presence of team stakeholder records, which have members and access rights for each of those members. When a user interface is shown to a user who is a member of a team (e.g., listed on a team stakeholder record), only actions to which users get access may be displayed. When a relationship is created, a workflow prompts a user to provide one or more details corresponding to the data fields in either of entity A and entity B in order to set up the relationship. Team stakeholders and teams may be managed separately using a management interface, in some embodiments, so that relationships can be formed without requiring a new team object to be created each time. Some teams, such as a single-member team for the CEO of a company, may be created by default by the system.

Figure 8:
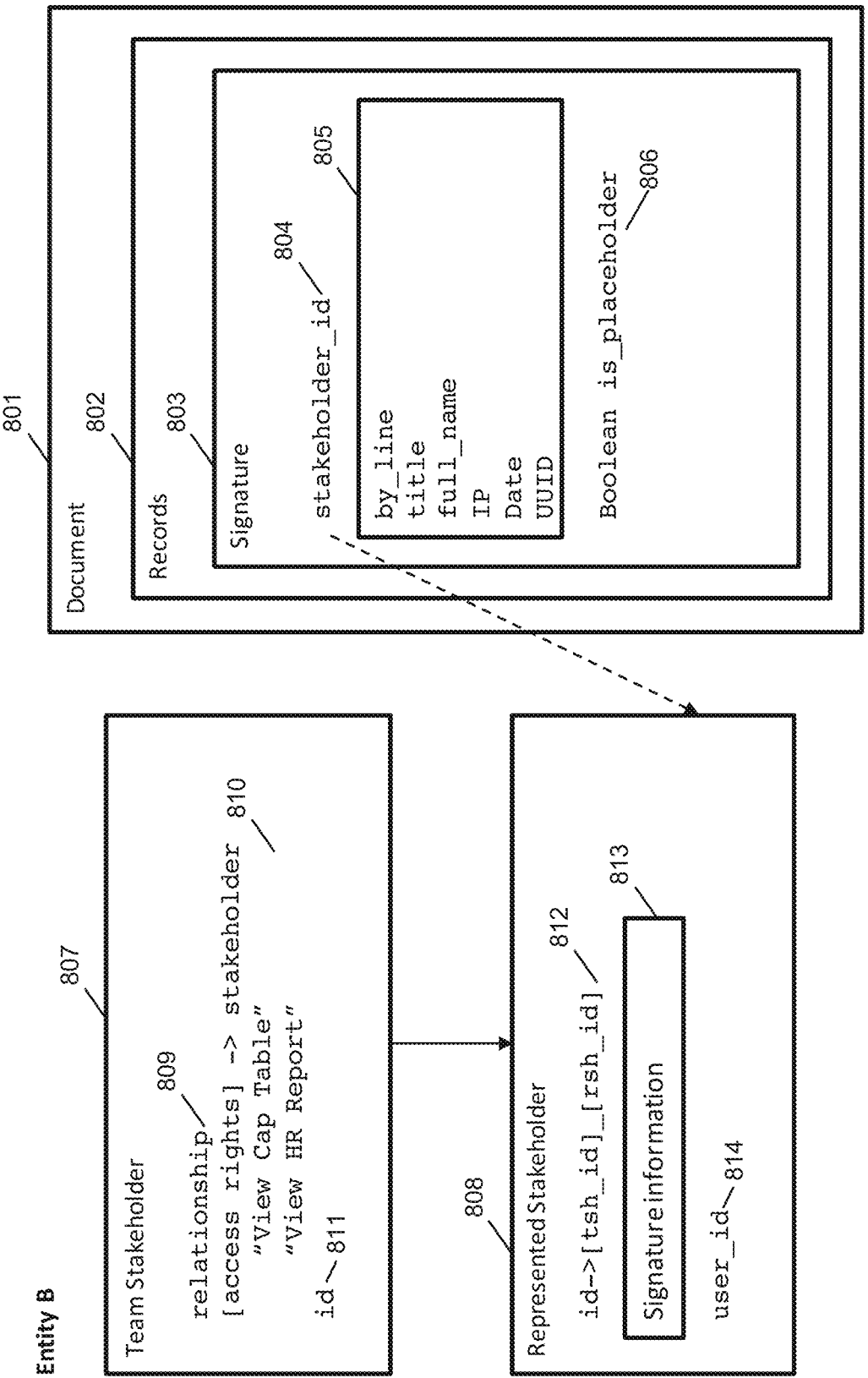
FIG. 8 is a data model diagram of team stakeholders in accordance with some embodiments.

FIG. 8 is a data model diagram of team stakeholders in accordance with some embodiments. Each team stakeholder 807 includes a relationship ID or reference 809, and an array of access rights for each stakeholder 810, here shown as "View Cap Table" and "View HR Report," as well as an individual team stakeholder identifier 811, namespaced to the stakeholder namespace or team stakeholder namespace, in some embodiments. Team stakeholders have as members one or more represented stakeholders 808, each of which includes an identifier that includes both the team stakeholder ID and represented stakeholder ID 812. In some cases this identifier may be constructed by traversing references. Signature information 813, including byline, name and title, and user ID 814, are also part of the represented stakeholder.

Also shown are document 801, a representation of a legal document as shown in FIG. 4 as 410, which contains document records 802, which may contain signature values 803, which contain a stakeholder ID 804, signature data elements 805, and placeholder identifier 806. Document 801 and records 802 are as described elsewhere herein and in U.S. patent application Ser. No. 14/614,227. Stakeholder ID 804 is a reference to a represented stakeholder 808. Signature information 813 may include a byline, which indicates the specific role of the signer, as well as an IP address and a date of signing. Signature information 813 may also include a quick response (QR) code (not shown) or may provide information suitable for encoding in a QR code.

In operation, the data model may function as follows. For a standard non-disclosure agreement made between two parties, each corporate entity may store the NDA document, which includes a core record corresponding to the NDA agreement. The core record includes a signature, which indicates who signed off on the NDA. When the document is being generated by a business method module or action workflow, the document may be generated with a boolean flag indicating that the signature has not yet been applied. In this case, the signature block contains the information for the person or persons who is/are eligible to sign the NDA. Once the document has been signed by that person, the boolean placeholder flag is flipped to indicate that the document is no longer a placeholder and that the signatures have been applied.

Figure 9:
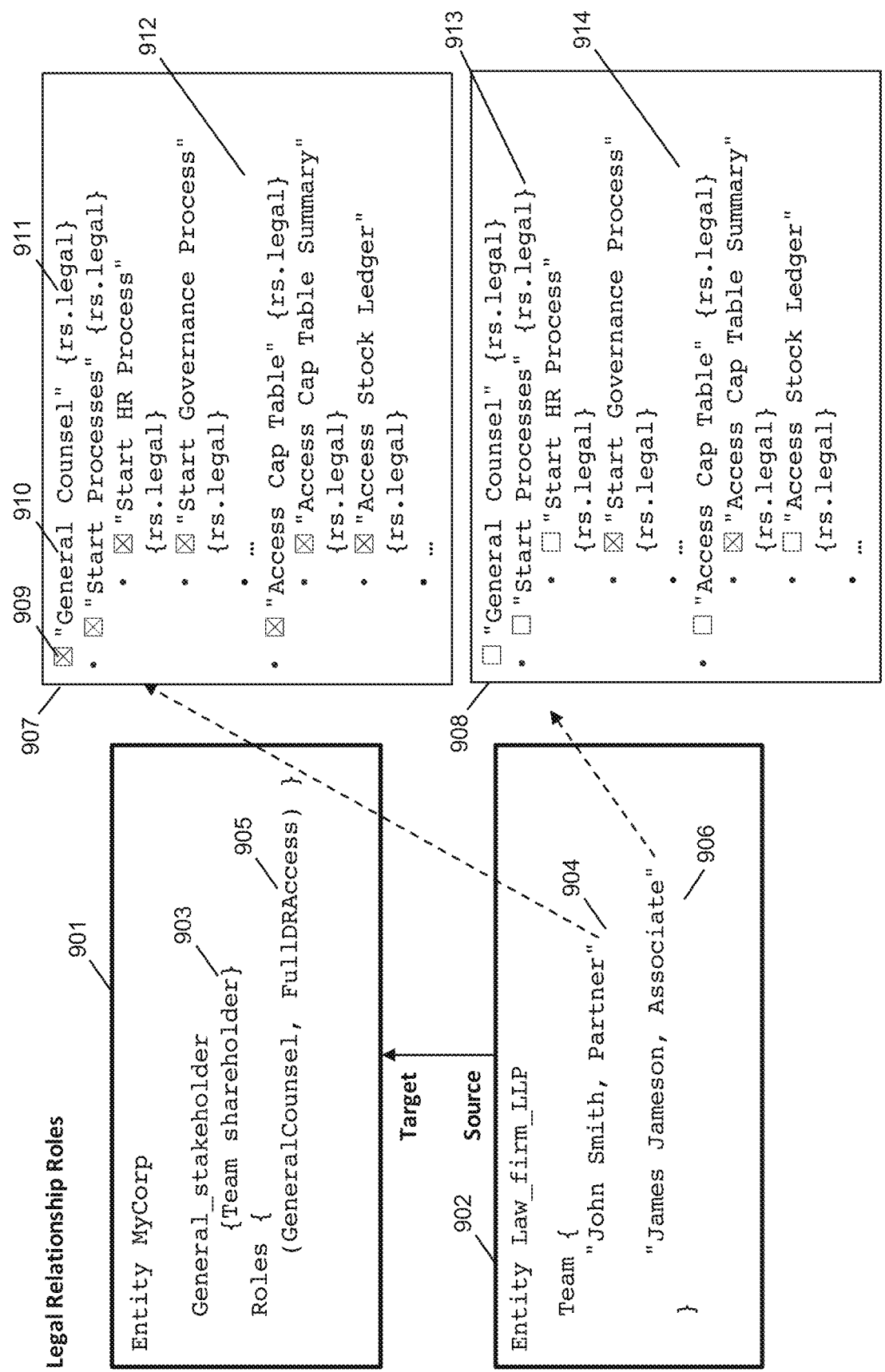
FIG. 9 is a data model diagram of a relationship between a law firm and another entity, in accordance with some embodiments.

FIG. 9 is a data model diagram of a relationship between a law firm and another entity, in accordance with some embodiments. Entity MyCorp 901 includes a general stakeholder 903, which is a team stakeholder, as well as a set of roles 905, which includes "General Counsel" and "Full DR (data room) access." MyCorp is related to entity Law_firm_LLP 902, which includes a team 904, which includes two entries, "John Smith, Partner" and "James Jameson, Associate." Law_firm_LLP 902 is the source of the relationship team, and MyCorp is the target of the relationship team. MyCorp grants Law_firm_LLP all roles in set 905, and Law_firm_LLP is then able to assign roles for each member of the team.

Roles 907 are the roles assigned to "John Smith, Partner." The roles include checkboxes 909, role names 910, and a tag 911. John Smith is the Primary Manager for Law_firm_LLP. As a result, John Smith has access to all roles that are given to Law_firm_LLP, as shown by the checkboxes 909 being checked in the roles list 907. Role name 910 is a human-readable name. Role tag 911 is, in some embodiments, a text-based tag. The tag may be used by the system to find particular roles. The tag may also be used to set up a prefix-based hierarchical namespace, such that a search for a prepended string will match a plurality of roles in the namespace (e.g., rs.legal matches all legal roles). In some embodiments, a set-based intersection algorithm may be used to identify which roles are matched.

Roles 908 are the roles assigned to "James Jameson, Associate," which are a subset of the roles assigned to "John Smith, Partner," and which are under the management and control of John Smith, as well. Roles that are hierarchically arranged and that are checked grant access to all sub-roles as well.

Figure 10:
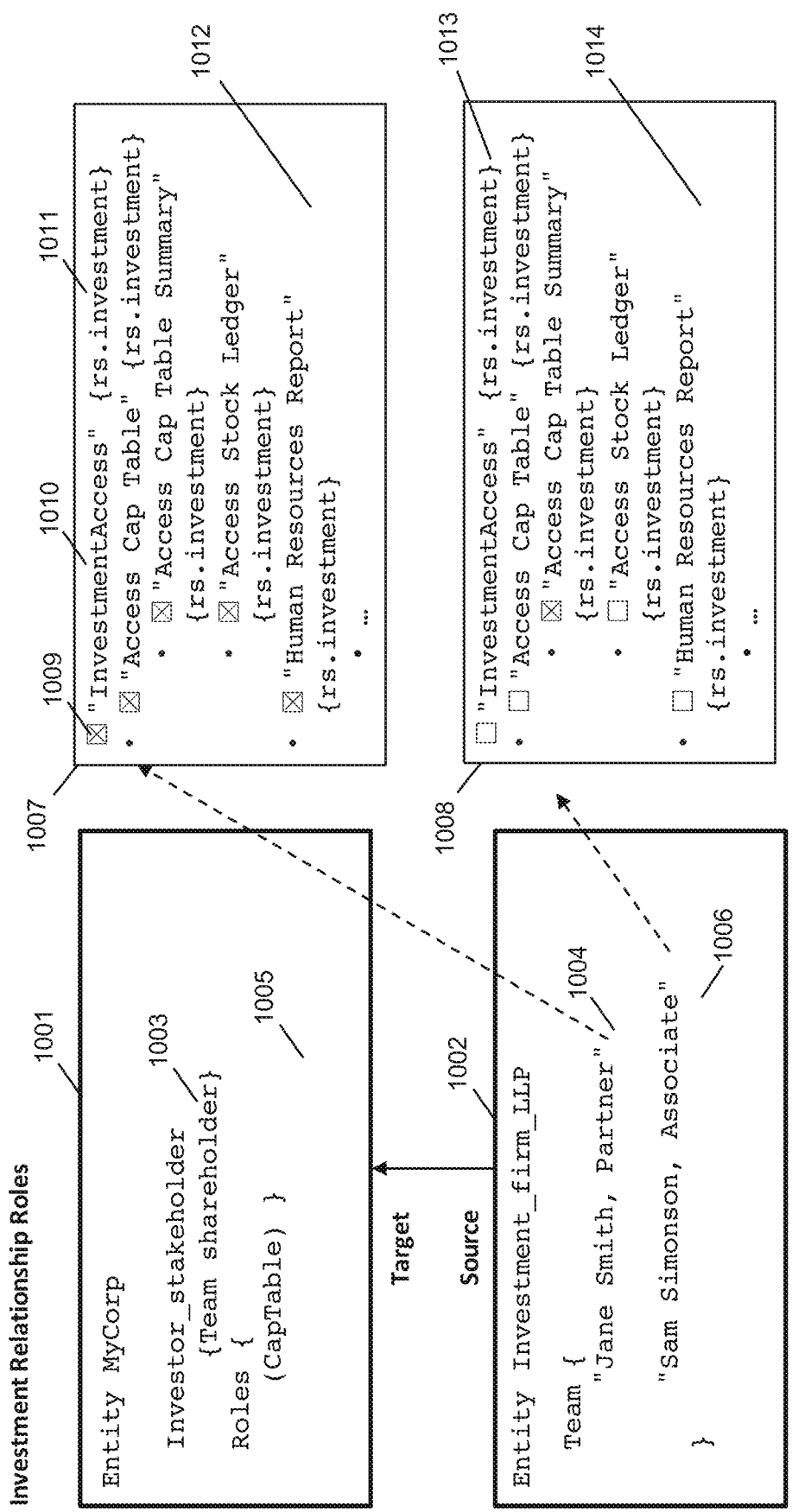
FIG. 10 is a data model diagram of a relationship between an investment firm and another entity, in accordance with some embodiments.

FIG. 10 is a data model diagram of a relationship between an investment firm and another entity, in accordance with some embodiments. Similar to the data model diagram for the law firm in FIG. 9, entity MyCorp 1001 is a target entity, and company Investment_firm_LLP 1002 is a source entity. MyCorp 1001 has Investor_stakeholder 1003, which is a team stakeholder reference, and a list of roles 1005, which includes "CapTable." Investment_firm_LLP 1002 includes a team with members "Jane Smith, Partner," and "Sam Simonson, Associate."

The list of roles available to each team member is computed from the roles assigned to the team stakeholder on the target entity. This makes the roles tree as seen in 1007 and 1008 dynamic and provides ultimate access control to the executives of the target entity as shown in FIG. 1. Here, "Jane Smith" has access to roles 1007. As Smith is the primary connection and primary manager, Smith is able to access all roles in list 1007. Smith may give some access to Simonson. Smith is not able to grant access to Simonson beyond what she has been granted and what Investment_firm_LLP has been granted.

A set-based intersection operation may be performed to determine what access each user has. Jane Smith is handled specially as she is the primary team member/relationship holder. The system may implement primary team members as a set defined to contain all available roles. Intersection of Jane Smith's granted role set and the set of roles 1007 granted by entity MyCorp to Investment_firm_LLP results in the entire set of roles 1007. Sam Simonson's granted role set is more limited. Intersection of his granted role set and the set of roles 1007 granted by entity MyCorp results in the reduced set of roles 1008.

Figure 11:
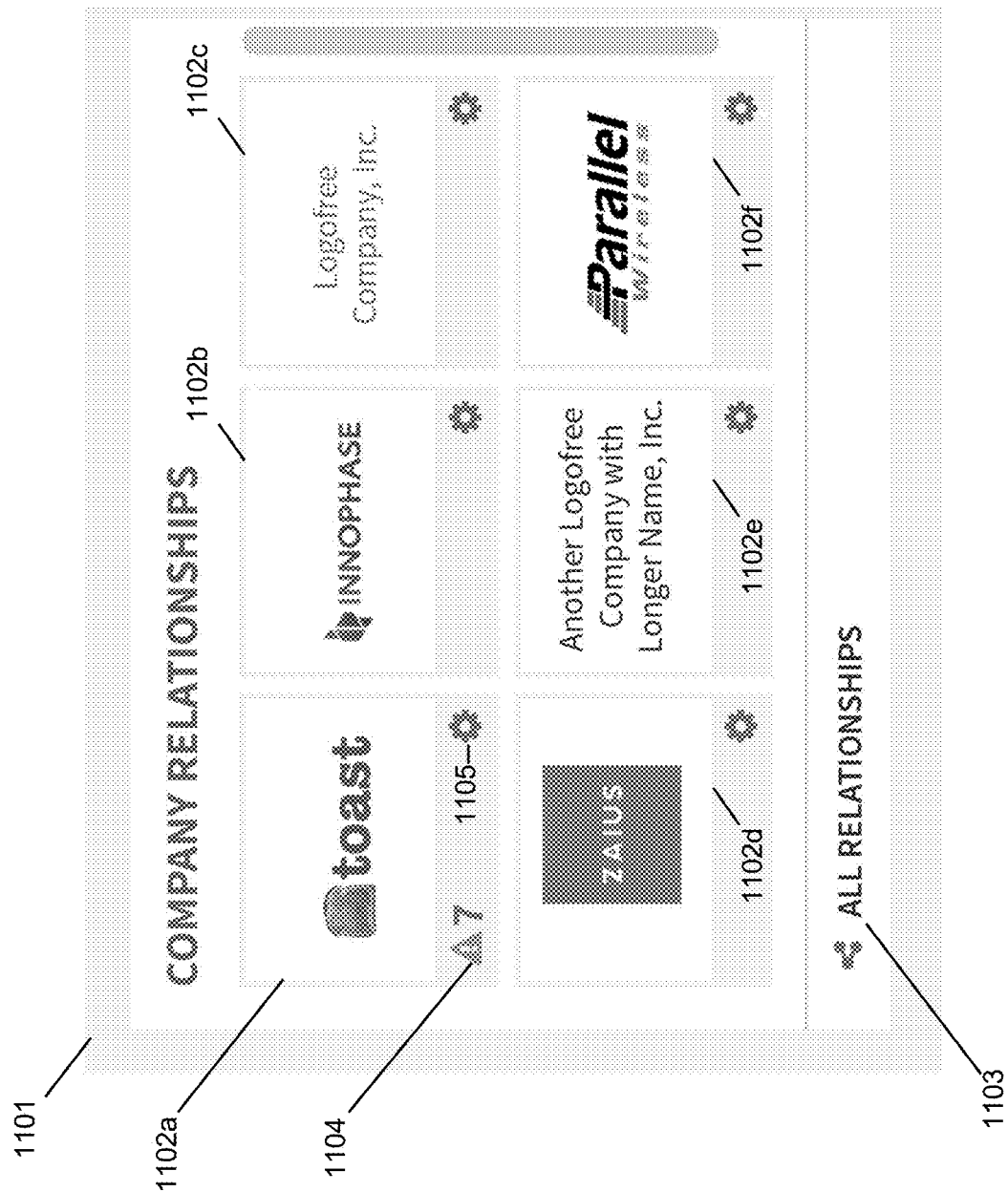
FIG. 11 is a schematic diagram of a user interface for company relationships, in accordance with some embodiments.

FIG. 11 is a schematic diagram of a user interface for company relationships, in accordance with some embodiments. User interface 1101 shows a visual representation to a user of each company or legal entity the user is involved with, with some or all of the set of such companies being represented. Each of the rectangular buttons 1102a, 1102b, 1102c, 1102d, 11023, 1102f represents a company. In some embodiments, the rectangular buttons may be arranged in a rectangular panel, and ordered according to any arbitrary order. In some embodiments, some companies may have alerts, and may appear first in the order, prioritized by number of alerts. For example, alert icon 1104 indicates that company 1102a has seven alerts at this time, whereas the other companies have no alerts. Icon 1105 may permit the user to manage settings pertaining to a particular company, or to manage relationships with the particular company. Link 1103 may permit a user to access an alternate view of company relationships, which may include, in some embodiments, a graphical view of the relationships between companies, a textual description of the relationships, or another view. In some embodiments, the rectangular panel may scroll to display hidden elements. In some embodiments, a user may want to view all of his or her company relationships at one time, and may access this visual representation. Or, a user may want to access a view of the system specific to one company, at which time the user may select one of the rectangular buttons to access such a view.

Figure 12A:
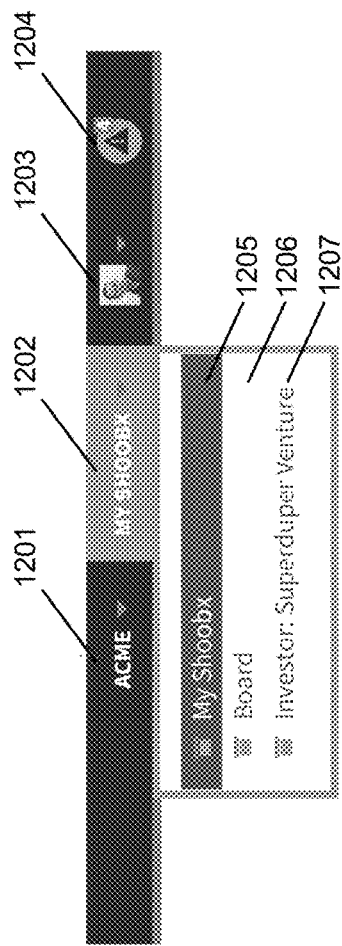
FIGS. 12a and 12b are schematic diagrams of a user interface of user alerts with company relationships, in accordance with some embodiments.
Figure 12B:
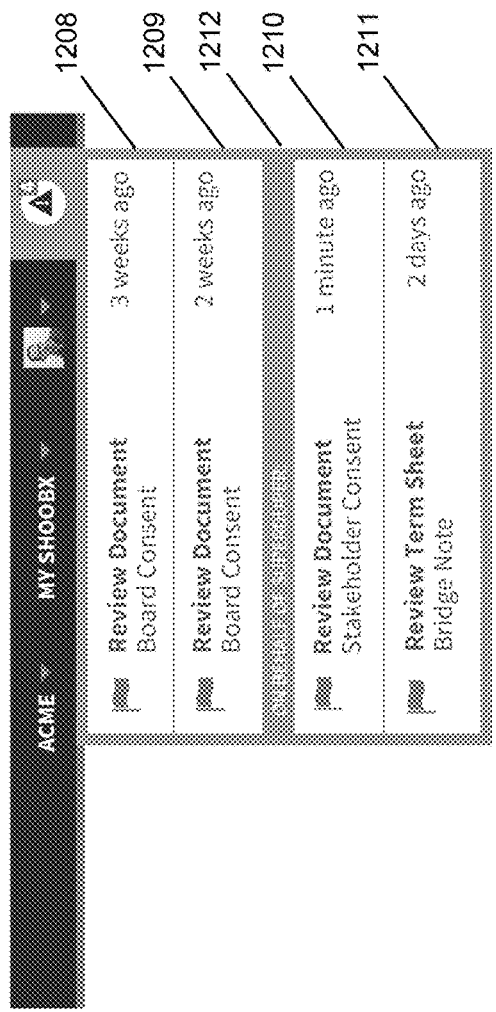

FIGS. 12a and 12b are schematic diagrams of a user interface of user alerts with company relationships, in accordance with some embodiments. Both the user alert interfaces of FIG. 12a and FIG. 12b are suitable for display as part of a menu bar or status bar at the top of a user interface area. Labels 1201, 1202, 1203, 1204 are shown, each of which may provide a selectable or clickable control for a user to manipulate.

Label 1201 reflects the name of a currently selected company, which affects the other views and controls that a user can view. An arrow next to label 1201 allows a user to select other companies, for example, to permit a user to perform actions in his or her representative capacity with the other companies and not in his or her capacity as an officer or employee of the currently-selected company.

Label 1202 permits a user to switch between multiple roles, as opposed to the company to which the roles correspond. Label 1202 passively indicates the currently-active role without action required by the user. When clicked, label 1202 allows a user to see multiple available roles 1205, 1206, 1207, as shown in FIG. 12a. Role 1205, here marked "My Shoobx," allows a user to manage corporate actions and documents in his or her own personal capacity, i.e., with a self relationship. Role 1206, here marked "Board," allows the user to manage corporate actions in his or her capacity as a member of the board of directors of the currently-selected entity. Role 1207, here marked "Investor: Superduper Venture," allows the user to manage corporate actions in his or her capacity as an investor in the current entity. This type of role may appear if the user is a member of a venture capital firm, the venture capital firm has a relationship with the current entity, and the venture capital firm has designated the user as being a member of a team associated with the current entity, as described elsewhere herein.

Label 1203 shows a visual representation of the user, and may cause a menu to appear allowing the user to change personal settings in the system.

Label 1204 shows an alert icon, and shows a current number of alerts for review by the user. FIG. 12b shows several examples of alerts that appear when the user selects the alert icon. Each alert has a required action name, a workflow type, and a time that the alert was generated. Alert 1208 and alert 1209 are requests for the user to review documents, generated out of board consent workflows. Alert 1208 indicates that it was generated three weeks ago, while alert 1209 was generated two weeks ago.

Label 1212 indicates that alerts 1210 and 1211 reflect workflows that are being performed "on behalf of Superduper," i.e., on behalf of another entity than the current entity, here, in the user's capacity as a representative of an investment firm. Alert 1210 indicates that the user is requested to review a document as part of a stakeholder consent workflow. Alert 1211 indicates that the user is requested to review a term sheet as part of a bridge note workflow. Note that alert 1210 has a time generated of "1 minute ago." While ordinary legal processes rarely have fine granularity regarding the time that an action is requested, in some cases requiring backdating to satisfy legal requirements, the system described herein operates in a largely linear manner, with some parallelized steps, in some embodiments. This allows the system to have a high degree of internal consistency, to assign timestamps to each step of the process, and to notify other users of these timestamps.

Figure 13:
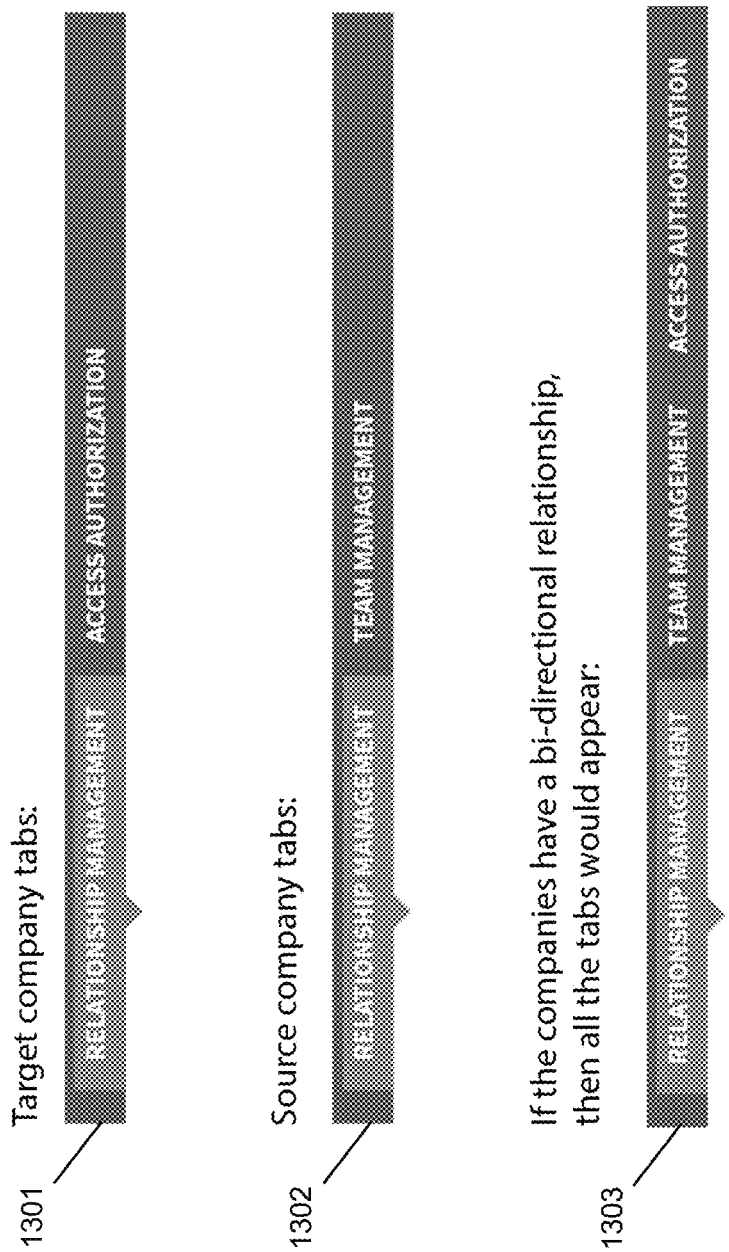
FIG. 13 is a schematic diagram of a user interface of user actions with company relationships, in accordance with some embodiments.

FIG. 13 is a schematic diagram of a user interface of user actions with company relationships, in accordance with some embodiments. A user may be presented with an opportunity to manage aspects of the relationship between two companies, such as from a company selection screen. If the user is a member of the target company, he or she may see relationship management tabs as shown by tabs 1301. If the user is a member of the source company, he or she may see relationship management tabs as shown by tabs 1302. If the two companies have a bi-directional relationship, e.g., wherein each company is both a source and a target, the set of tabs 1303 will include both the tabs that are intended to be shown for the source and the target.

Specifically, in tabs 1301, the user of a target company may be permitted to perform general relationship management tasks such as: displaying information from the source company, such as company name, contact information, who the relationship manager is for the source company, and who the team members are for the source company; and terminating a relationship. The user of the target company may also be permitted to perform access authorization tasks, for granting access to members of the source company to view information of or perform actions on behalf of the target company. From the perspective of the target company, there is no ability to control who at the source company has access, other than disallowing access to certain rights to all employees of the source company, in some embodiments. This tab would be used, in some embodiments, to provide data room access, and to grant access to certain processes, panels, and applications in the system.

In tabs 1302, the user of a source company may be permitted to perform general relationship management tasks, and also team management tasks. The general relationship management tasks may include both terminating a relationship and also changing a designated relationship manager for the relationship. The relationship manager is a person who is an employee of the source company. In the common case that the person who is the designated relationship manager leaves the source company, the ability to change the relationship manager enables the source company to retain the relationship with another person as the designated relationship manager. The user of the source company may also be permitted to perform team management tasks, such as registering team members and defining access levels and access privileges for team members. While the target company is not able to control varying levels of access among team members, the source company's relationship manager is able to perform this control with a fine degree of granularity, in some embodiments.

Tabs 1303 includes all tabs that are provided to either the source or the target company, as shown, including a basic relationship management tab, a team management tab, and an access authorization tab.

Figure 14:
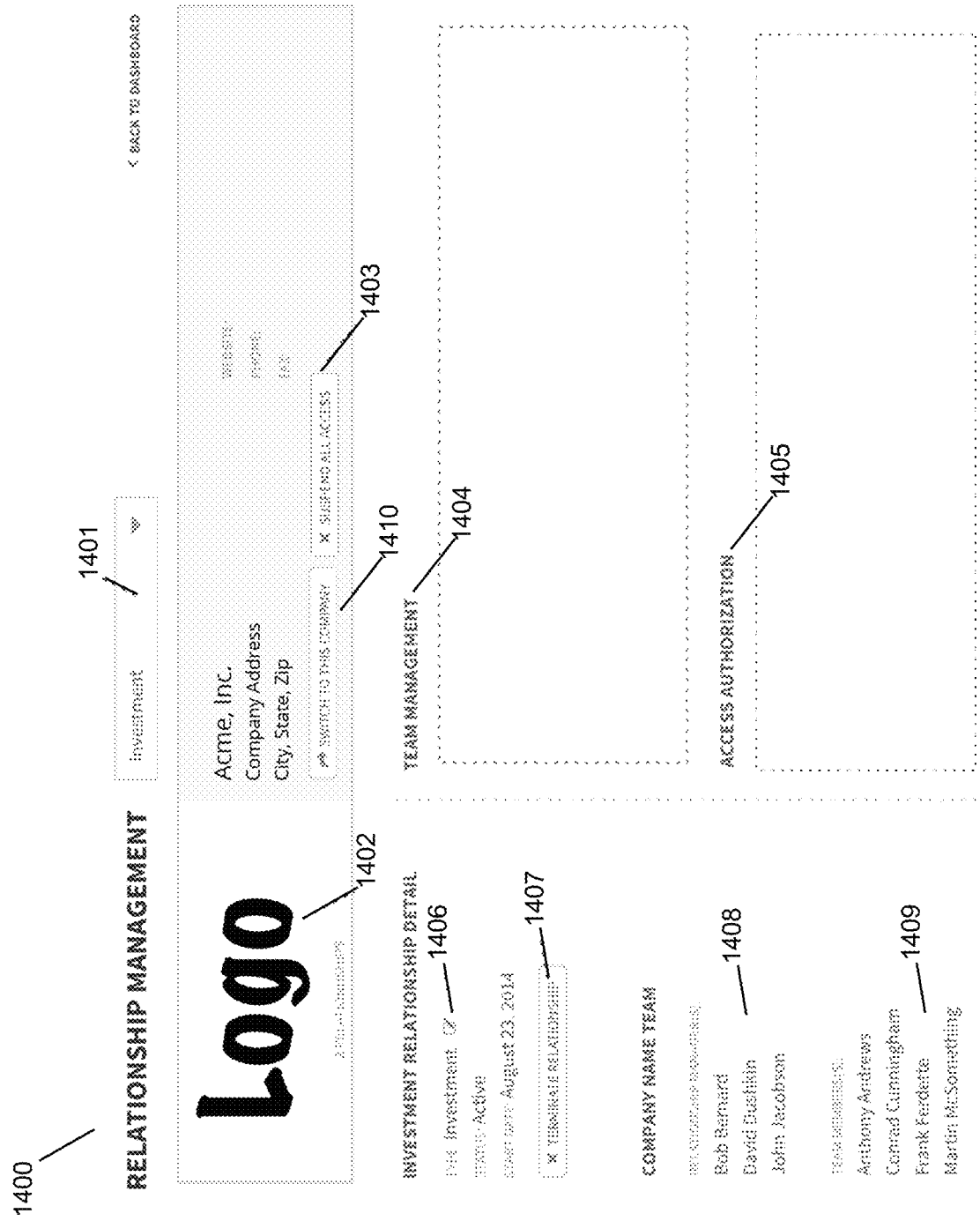
FIG. 14 is a schematic diagram of a user interface for relationship management, in accordance with some embodiments.

FIG. 14 is a schematic diagram of a user interface for relationship management, in accordance with some embodiments. Each user has a company with which he or she is logged in. When the user selects another company in the relationship screen, the interface of FIG. 14 could be used, in some embodiments, to show details about the relationship. User interface 1400 includes a title bar that indicates its purpose, relationship management, as well as menu 1401 for changing the type of relationship if more than one relationship exists between two companies. Logo 1402 serves to identify the company. Button 1403 permits a user to suspend access by the relationship company to the user's company.

Panel 1404 is a visual blank placeholder for user interface 1500. It may appear in the case the user's logged-in company is the source company and the company identified by logo 1402 is the target company; team members and access controls may be shown in panel 1404. Panel 1405, for access authorization, may appear in the case the user's logged-in company is the target company and the company identified by logo 1402 is the source company; this panel may permit the user to identify the maximum access that a represented stakeholder will have within the target entity.

Control 1406 may permit a user to change the type of relationship. Button 1407 may permit a user to terminate the relationship between the user's logged-in company and the company identified by logo 1402. Other information, such as relationship status and start date, may also be shown.

Text areas 1408 and 1409 may show, if the user's logged-in company is the target company, the names of the people who are the relationship managers 1408 and the team members 1409, from the source company. Control 1410 may permit a user to switch between a view for the source company and a view for a target company, in the case that a bi-directional relationship exists between the companies.

Figure 15:
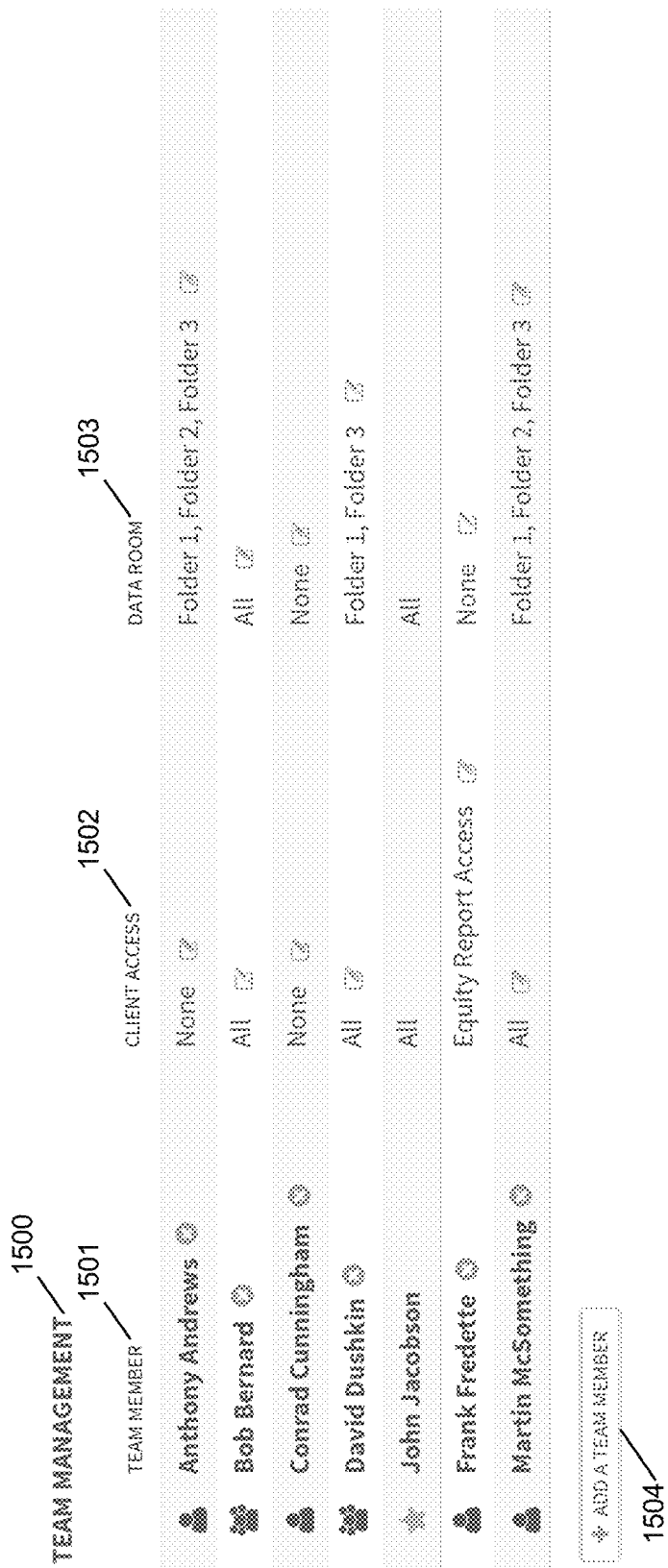
FIG. 15 is a schematic diagram of a user interface for team management, in accordance with some embodiments.

FIG. 15 is a schematic diagram of a user interface for team management, in accordance with some embodiments. A team management user interface 1500, as would be shown to an executive or relationship manager user belonging to the source company, is shown. Team member listing 1501, client access information 1502, values for which can vary based on the implementation, and accessible data room directories 1503 may be shown, as well as button 1504 for adding new team members. As shown, team member listing 1501 may include one button next to each member's name listing, for purposes of removing someone from a team. The buttons next to the client access entries 1502 and data room entries 1503 allow for editing team member access privileges. A primary relationship manager or executive may be subject to special controls, such as not being able to be deleted from a team, or being automatically included on a team at the time the application server is started.

Figure 16:
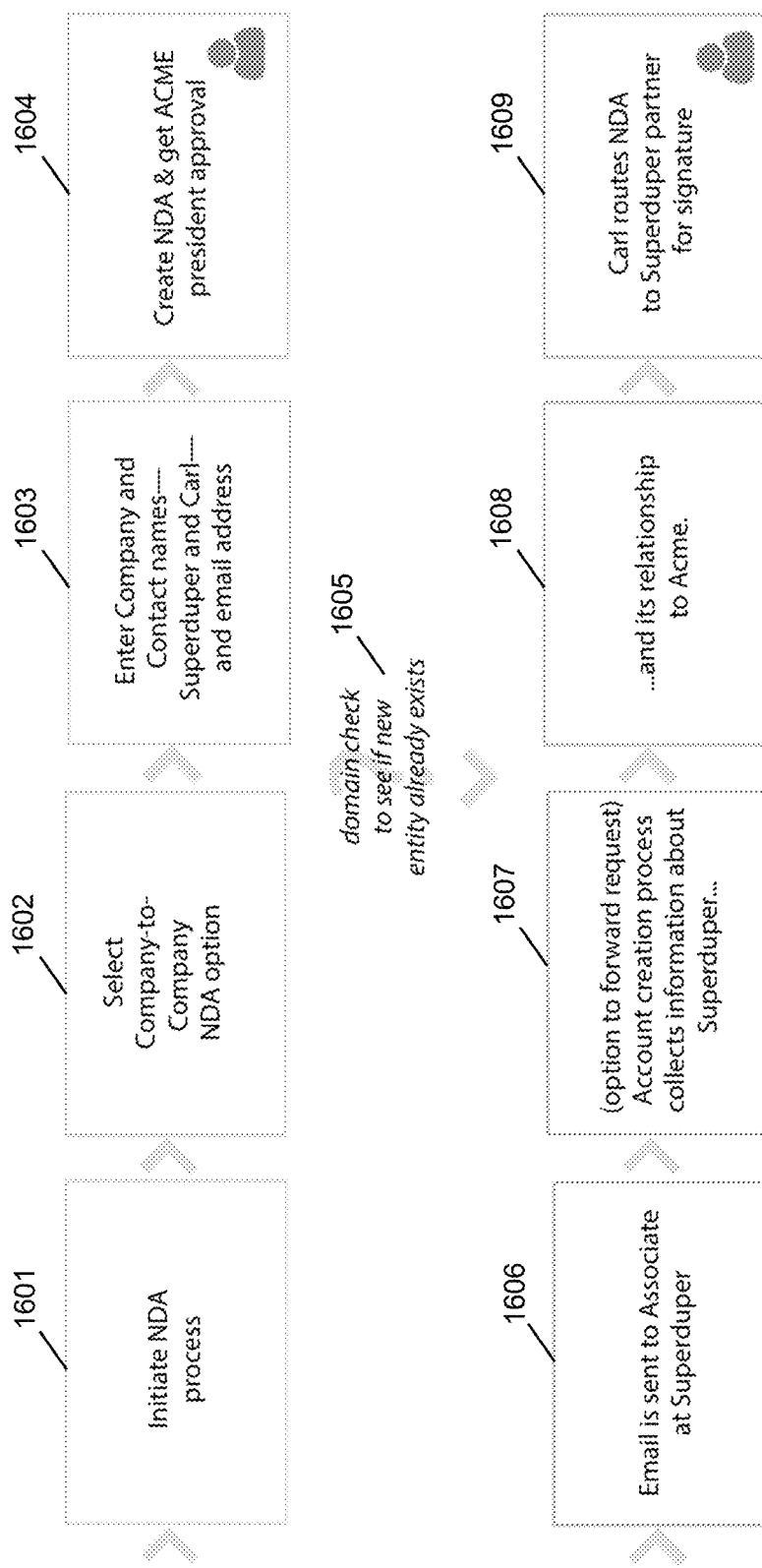
FIG. 16 is a flowchart of a user process with a relationship between legal entities, in accordance with some embodiments.

FIG. 16 is a flowchart of a user process with a relationship between legal entities, in accordance with some embodiments. At step 1601, a non-disclosure agreement process is started by a user, for creating an NDA between the user's company and another company. At step 1602, the user selects a company-to-company NDA option. At step 1603, the user may enter the name of the other company, and will enter in information about a specific contact person at the other company and their email address. At step 1604, based on the information input into the system, the system may create an NDA document. The document is then forwarded to the president of the user's current company for approval.

At step 1605, the system may check to see if the other company already exists as a company in the system. If no existing record is found, an email is sent at step 1606 to the email address identified by the user at step 1603. At step 1607, the account creation process collects information about the other company, such as is already collected by census, and at step 1608, the account creation process collects information about the other company's relationship with the current company, such as who the members of the project team area. At step 1609, the NDA which had previously been sent to the associate at the investment firm sends it up the chain to the partner at the investment firm for his or her signature, facilitated by the system, which alerts the partner that his or her signature is needed.

Figure 17:
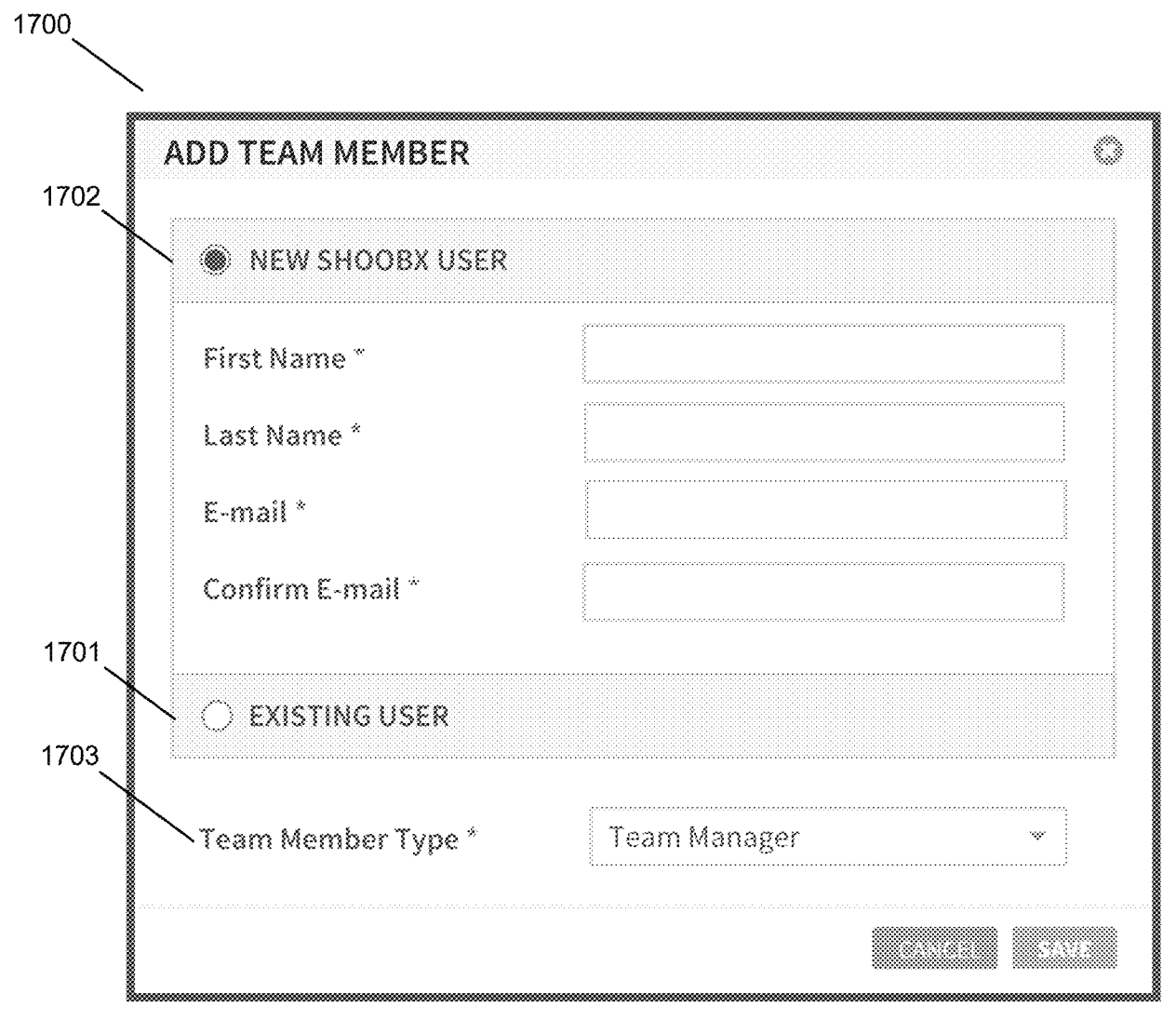

FIG. 17 is a schematic diagram of a user interface for adding a team member, in accordance with some embodiments. User interface 1700 permits a user to add an existing user with control 1701, which permits a user to select a user. Alternatively, a new user may be solicited or created with control 1702. Control 1703 permits the administrative user adding the team member to assign the relationship role of that company without any delay.

Figure 18:
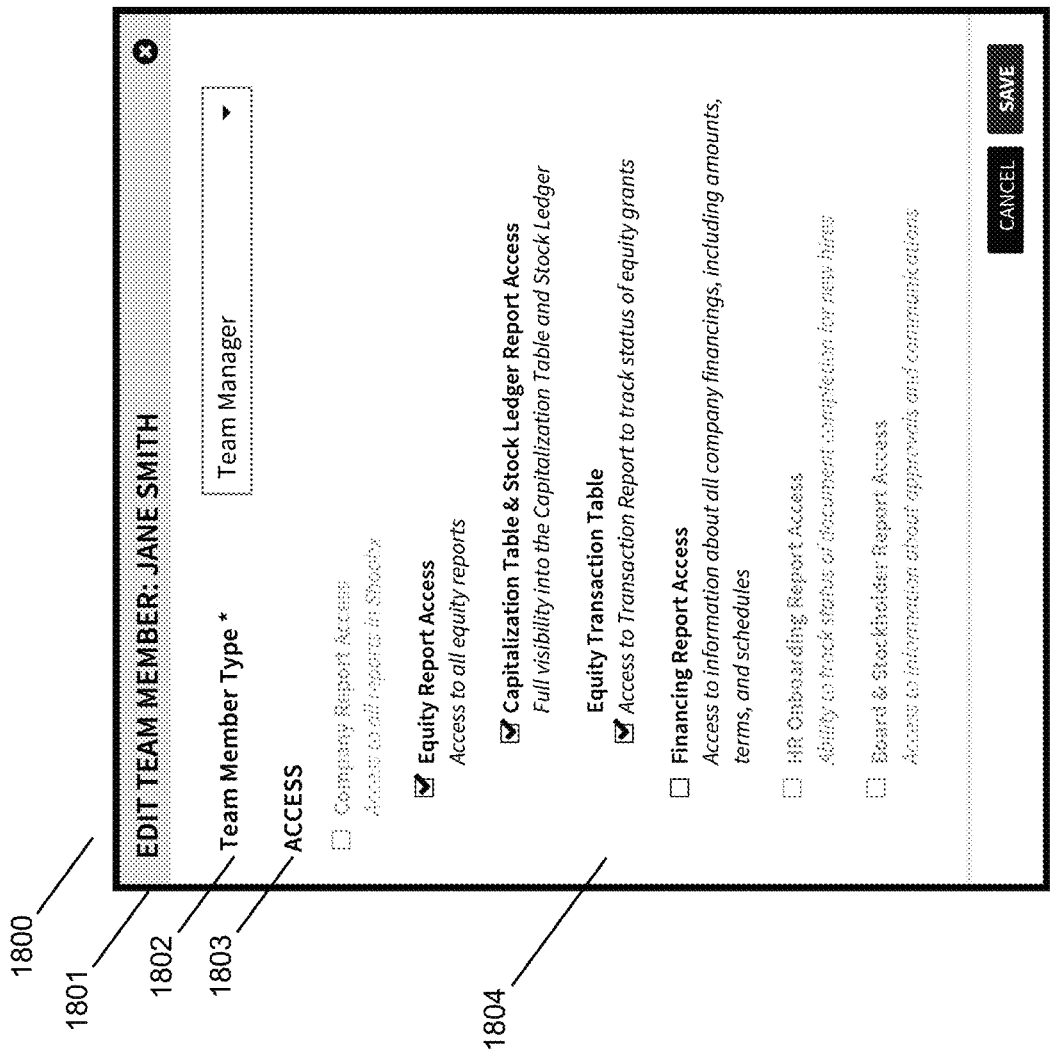
FIG. 18 is a schematic diagram of a user interface for managing team member roles, in accordance with some embodiments.

FIG. 18 is a schematic diagram of a user interface for managing team member roles, in accordance with some embodiments. User interface 1800 shows an edit team member screen with title 1801 and relationship role selection menu 1802. The Access area 1803 shows all available roles for the team member. Black entries are selectable. When a parent node is selected via the checkbox control, all children will be also selected but are lightly grayed out to signal the inability to modify, in some embodiments. Fully grayed out roles, such as "Company Report Access", are roles that are part of the roles tree but have not been enabled for the team stakeholder on the target entity side.

In some embodiments, changes to relationship information may be retained in a log file to permit auditing. In some embodiments, the relationship information may be queried at any given time and output as a report. Bulk editing of privileges, roles, users, team members, and other information is also contemplated, in some embodiments.

Various alternatives are also contemplated and fall within the scope of the present disclosure. Any aspects of one embodiment may be combined with aspects of other embodiments, and embodiments may lack or omit features present in other embodiments. Where identifiers (IDs) are used herein, in some embodiments references may be used instead, and vice versa.

The invention claimed is:

1. A system for representing relationships between corporate entities in an investment transaction, comprising:
   a first entity record for a first legal entity, the first legal entity being an investment firm, further comprising a first relationship object reflecting a first relationship team of persons belonging to the investment firm;
   a second entity record for a second legal entity, the second legal entity being an investment fund, further comprising a reference to the first relationship object referring to the first relationship team of persons belonging to the investment firm; and
   a third entity record for a third legal entity, the third legal entity being an investment target, further comprising a second relationship object reflecting a second relationship team of persons belonging to the investment firm,
   wherein the first and the second relationship objects further comprise access privileges,
   wherein the first relationship object further comprises a byline and title to be used for signing documents and performing legally authorized actions by the first relationship team of persons belonging to the investment firm within the context of the investment fund,
   wherein the first entity record is referenced within the second entity record and the third entity record, and
   wherein at least one person is a member of both the first relationship team and the second relationship team, thereby being able to perform actions in both the context of the second legal entity and the third legal entity,
   thereby enabling the at least one person of the investment firm to sign documents in a representative capacity for the investment fund.

2. The system of claim 1, wherein the first relationship object refers uni-directionally to the first relationship team from the first entity record.

3. The system of claim 1, wherein the at least one person can receive delegated access rights, roles, and other privileges delegated to it by the investment fund through a corporate officer of the investment fund.

4. The system of claim 1, wherein the system is configured to enable recording of an investment relationship between the first legal entity, the second legal entity, and the third legal entity.

5. The system of claim 1, wherein the first relationship team of persons is a subset of all employees of the investment firm.

6. The system of claim 1, wherein the system is configured to enable the investment firm and the investment fund to be coalesced at a user interface logic layer so that a user of the user interface logic layer sees the investment firm and does not see the investment fund when performing business operations.

7. The system of claim 1, wherein a list of roles available to each team member is computed using a set-based intersection operation.

8. The system of claim 1, wherein a particular user is enabled to perform actions in his or her representative capacity with either the first legal entity, the second legal entity, or the third legal entity, and not in his or her capacity as an officer or employee of a currently-selected company.

9. The system of claim 1, further comprising a user interface for allowing a particular user to visualize his or her relationships with the first legal entity and the second legal entity.

10. The system of claim 1, wherein the system is configured to enable recording of a plurality of investment relationships between an investment firm, a plurality of affiliate funds of the investment firm, and a plurality of companies receiving investment.

11. A system for performing business actions in a database system, comprising:
    at least one database configured to store an entity record, a document record, and a stakeholder record,
    the entity record being for a first investment firm entity and enabled to relate itself to a second entity record for a second investment fund entity by referring to a relationship team, and by setting access privileges for members of the relationship team, and by setting a byline and title to be used for signing documents and performing authorized actions by the relationship team within the context of the first investment firm entity, so that the members of the relationship team of the second investment fund entity may perform actions on behalf of the first investment firm entity,
    the entity record also enabled to relate itself to a third entity record for a third legal entity, the third legal entity being an investment target, the third legal entity having a separate relationship team with the entity record with separate access privileges; and
    a business logic module configured to provide creation of document records with document signing, and configured to create documents with a byline for electronic signature by the members,
    thereby enabling legally authorized document signing by a person belonging to an investment firm on behalf of an investment fund.

12. A system for performing business actions in a database system, comprising:
    at least one database configured to store an entity record, a document record, and a stakeholder record,
    the entity record for a first entity enabled to relate itself to a second entity record for a second entity by referring to a relationship team, and by setting access privileges for members of the relationship team, and by setting a byline and title to be used for signing documents and performing authorized actions by the relationship team within the context of the first entity, so that the members of the relationship team of the second entity may perform actions on behalf of the first entity,
    the entity record also enabled to relate itself to a third entity record for a third legal entity, the third legal entity being an investment target, the third legal entity having a separate relationship team with the entity record with separate access privileges,
    the access privileges stored as a hierarchical tree of roles and associated with individual members of the relationship team; and
    a security module for granting access to users, the security module configured to perform a set-based intersection of roles assigned to the user and roles delegated to the second entity record by the first entity, thereby enabling recording of an investment relationship between an investment firm, an affiliate fund of the investment firm, and a company receiving investment.

13. A system for organizing, managing, and reporting data relating to a legal entity, comprising:
   at least one database configured to store an entity record, a document record, and a stakeholder record and a second stakeholder record,
      the entity record representing the legal entity, the legal entity being an investment fund,
      the document record relating to a corporate action of the legal entity and further comprising a core record, the core record further comprising a provenance of the value reflecting a chain of documents that together reflect a canonical state of the corporate entity and a history of states of the corporate entity for allowing the business logic module to assess validity of the value at a given time by evaluating where the value was originated,
      the stakeholder record comprising one of a represented stakeholder record for representing a single system user and a team stakeholder record for representing multiple system users belonging to another legal entity within the context of the investment fund,
      the team stakeholder record further identifying access rights and setting a byline and title to be used for signing documents and performing legally authorized actions by the multiple system users of the team stakeholder record within the context of the investment fund, for each system user represented in the team, the access rights specific to and granted by the investment fund,
      the second stakeholder record further comprising a second team stakeholder record, the second team stakeholder record further identifying access rights within the context of an investment target, and
   a business logic module, coupled to the at least one database and configured to create the stakeholder with the role and to bind the stakeholder to the entity record,
   the business logic module thereby enabling the system to determine whether a given stakeholder has a particular role represented in the entity record for the legal entity and enabling the system to permit a single system user to have multiple roles in the context of the another legal entity and the context of the investment fund.

14. A system for organizing, managing, and reporting data relating to legal corporate entities in relationship with each other, comprising:
   at least one database configured to store a relationship source entity record representing an investment firm and a relationship target entity record representing an investment fund, each of the entity records representing legal entities,
   the relationship source entity configured to reference a team stakeholder record for a plurality of individuals belonging to the investment firm and having a role with the investment fund, the team stakeholder record further comprising a list of team members and access rights for each team member in the list of team members with the access rights organized in a hierarchical structure and labeled with a name, the team stakeholder record further setting a byline and title to be used for signing documents and performing legally authorized actions by the multiple system users of the team stakeholder record within the context of the investment fund,
   the relationship target entity configured to reference a second team stakeholder record with a list of access rights for a plurality of individuals belonging to the investment firm and having access rights within the context of an investment target; and
   a business logic module, coupled to the at least one database and configured to match the access rights of a team member of the relationship source entity to the list of access rights of the relationship target entity using a text-based matching system, wherein the text-based matching system enables all access rights further down in the hierarchy to be matched when a parent access right in the hierarchy is matched,
   the business logic module thereby enabling the system to determine whether a specific individual belonging to the investment firm may legally perform an action on behalf of the investment fund.

* * * * *